US007976372B2

(12) United States Patent
Baerlocher et al.

(10) Patent No.: US 7,976,372 B2
(45) Date of Patent: Jul. 12, 2011

(54) GAMING SYSTEM HAVING MULTIPLE PLAYER SIMULTANEOUS DISPLAY/INPUT DEVICE

(75) Inventors: Anthony J. Baerlocher, Reno, NV (US); Kimberly M. Campbell, Reno, NV (US); Christiaan R. Champagne, Las Vegas, NV (US); Dwayne A. Davis, Reno, NV (US); Hans Elias, Reno, NV (US); Damien C. Ennis, Reno, NV (US); Michael P. Khamis, Reno, NV (US); David N. Myers, Reno, NV (US); David M. Palmer, Reno, NV (US)

(73) Assignee: IGT, Reno, NV (US)

( * ) Notice: Subject to any disclaimer, the term of this patent is extended or adjusted under 35 U.S.C. 154(b) by 204 days.

(21) Appl. No.: 12/267,092

(22) Filed: Nov. 7, 2008

(65) Prior Publication Data

US 2009/0189351 A1 Jul. 30, 2009

Related U.S. Application Data

(60) Provisional application No. 60/986,870, filed on Nov. 9, 2007.

(51) Int. Cl.
*A63F 13/00* (2006.01)

(52) U.S. Cl. ................ 463/12; 463/16; 463/22; 463/25; 463/46; 273/138.2; 273/309; 273/274

(58) Field of Classification Search ............. 273/149 R, 273/149 P, 138.1, 138.2, 309, 274, 292; 463/12, 463/13, 16, 17, 22, 25–27, 46
See application file for complete search history.

(56) References Cited

U.S. PATENT DOCUMENTS

| | | | |
|---|---|---|---|
| 4,906,005 | A | 3/1990 | Manabe |
| 5,102,135 | A | 4/1992 | Addiechi |
| 5,636,838 | A | 6/1997 | Caro |
| 5,743,800 | A | 4/1998 | Huard et al. |
| 5,755,440 | A | 5/1998 | Sher |
| 5,839,955 | A | 11/1998 | Mangano et al. |
| 5,934,999 | A | 8/1999 | Valdez |
| 6,039,648 | A | 3/2000 | Guinn et al. |
| 6,053,823 | A | 4/2000 | Mathews |
| 6,059,658 | A | 5/2000 | Mangano et al. |

(Continued)

FOREIGN PATENT DOCUMENTS

EP 0956111 11/1999

(Continued)

OTHER PUBLICATIONS

U.S. Appl. No. 11/557,843, filed Nov. 8, 2006, Baerlocher.

(Continued)

*Primary Examiner* — Benjamin H Layno
(74) *Attorney, Agent, or Firm* — K&L Gates LLP

(57) ABSTRACT

A game table having a multiplayer interactive display/input device which enables multiple players to simultaneously play primary or base wagering games and/or secondary or bonus games using the display/input device. The display/input device enables multiple players to simultaneously interact with the game table and the various games using the same display/input device. The game table enables multiple players to manipulate displayed objects (such as virtual cards or other game symbols) displayed by the display/input device at the same time. This enables the display/input device to simultaneously display the same game to multiple players in an integrated seamless manner without the need for multiple different sets of display devices and input devices for each of the players.

19 Claims, 8 Drawing Sheets

U.S. PATENT DOCUMENTS

| | | | |
|---|---|---|---|
| 6,082,887 | A | 7/2000 | Feuer et al. |
| 6,083,105 | A | 7/2000 | Ronin et al. |
| 6,135,884 | A | 10/2000 | Hedrick et al. |
| 6,152,448 | A | 11/2000 | Cudlipp |
| 6,209,869 | B1 | 4/2001 | Mathews |
| 6,217,022 | B1 | 4/2001 | Astaneha |
| 6,309,299 | B1 | 10/2001 | Weiss |
| 6,312,334 | B1 | 11/2001 | Yoseloff |
| 6,497,409 | B2 | 12/2002 | Mathews |
| 6,498,590 | B1 | 12/2002 | Dietz et al. |
| 6,533,662 | B2 * | 3/2003 | Soltys et al. .................... 463/25 |
| 6,659,462 | B1 | 12/2003 | Scott |
| 6,666,766 | B2 | 12/2003 | Baerlocher et al. |
| 6,705,944 | B2 | 3/2004 | Luciano |
| 6,726,563 | B1 | 4/2004 | Baerlocher et al. |
| 6,726,565 | B2 | 4/2004 | Hughs-Baird |
| 6,733,390 | B2 | 5/2004 | Walker et al. |
| 6,743,094 | B2 | 6/2004 | Johnson |
| 6,851,674 | B2 | 2/2005 | Pierce et al. |
| 6,869,359 | B1 | 3/2005 | Mathews |
| 6,890,255 | B2 | 5/2005 | Jarvis et al. |
| 6,988,731 | B2 | 1/2006 | Inoue |
| 7,012,595 | B2 | 3/2006 | Lu |
| 7,029,395 | B1 | 4/2006 | Baerlocher |
| 7,030,861 | B1 | 4/2006 | Westerman et al. |
| 7,052,011 | B2 | 5/2006 | Pierce et al. |
| 7,059,603 | B1 | 6/2006 | D'avanzo |
| 7,094,150 | B2 | 8/2006 | Ungaro et al. |
| 7,169,044 | B2 | 1/2007 | Baerlocher et al. |
| 7,204,428 | B2 | 4/2007 | Wilson |
| 7,223,172 | B2 | 5/2007 | Baerlocher et al. |
| 7,226,357 | B2 | 6/2007 | Vancura et al. |
| 7,306,520 | B2 | 12/2007 | Kaminkow et al. |
| 7,329,179 | B2 | 2/2008 | Baerlocher |
| 7,331,868 | B2 | 2/2008 | Beaulieu et al. |
| 7,351,146 | B2 | 4/2008 | Kaminkow |
| 7,374,486 | B2 | 5/2008 | Baerlocher |
| 7,419,162 | B2 | 9/2008 | Lancaster et al. |
| 7,463,270 | B2 | 12/2008 | Vale et al. |
| 7,465,227 | B2 | 12/2008 | Baerlocher |
| 7,470,185 | B2 | 12/2008 | Baerlocher |
| 7,478,812 | B2 | 1/2009 | Sokolov |
| 7,479,949 | B2 | 1/2009 | Jobs et al. |
| 7,488,251 | B2 | 2/2009 | Kaminkow |
| 2002/0037765 | A1 | 3/2002 | Johnson |
| 2002/0077170 | A1 * | 6/2002 | Johnson et al. ................. 463/16 |
| 2002/0119824 | A1 | 8/2002 | Allen |
| 2002/0140680 | A1 | 10/2002 | Lu |
| 2002/0169017 | A1 | 11/2002 | Visoenik |
| 2002/0185981 | A1 | 12/2002 | Dietz et al. |
| 2003/0020733 | A1 | 1/2003 | Yin |
| 2003/0094752 | A1 | 5/2003 | Mathews |
| 2003/0144053 | A1 | 7/2003 | Michaelson |
| 2004/0053661 | A1 | 3/2004 | Jones et al. |
| 2004/0063492 | A1 | 4/2004 | Baerlocher et al. |
| 2004/0127284 | A1 | 7/2004 | Walker et al. |
| 2004/0166937 | A1 | 8/2004 | Rothchild |
| 2004/0171416 | A1 | 9/2004 | Baerlocher et al. |
| 2004/0198484 | A1 | 10/2004 | Johnson |
| 2004/0204218 | A1 | 10/2004 | Hughs-Baird |
| 2005/0009600 | A1 | 1/2005 | Rowe et al. |
| 2005/0032568 | A1 | 2/2005 | Griswold et al. |
| 2005/0054429 | A1 | 3/2005 | Baerlocher et al. |
| 2005/0060050 | A1 | 3/2005 | Baerlocher |
| 2005/0119043 | A1 | 6/2005 | Berman et al. |
| 2005/0162402 | A1 | 7/2005 | Watanachote |
| 2005/0215307 | A1 | 9/2005 | Jarvis et al. |
| 2005/0282625 | A1 | 12/2005 | Nicely |
| 2006/0022956 | A1 | 2/2006 | Lengeling et al. |
| 2006/0026521 | A1 | 2/2006 | Hotelling et al. |
| 2006/0030394 | A1 | 2/2006 | Crivelli et al. |
| 2006/0030959 | A1 | 2/2006 | Duhamel |
| 2006/0030960 | A1 | 2/2006 | Duhamel et al. |
| 2006/0032680 | A1 | 2/2006 | Elias et al. |
| 2006/0046821 | A1 | 3/2006 | Kaminkow et al. |
| 2006/0046849 | A1 | 3/2006 | Kovacs et al. |
| 2006/0052885 | A1 | 3/2006 | Kong |
| 2006/0058088 | A1 | 3/2006 | Crawford, III et al. |
| 2006/0068864 | A1 | 3/2006 | White et al. |
| 2006/0068870 | A1 | 3/2006 | Crawford, III et al. |
| 2006/0086896 | A1 | 4/2006 | Han |
| 2006/0097991 | A1 | 5/2006 | Hotelling et al. |
| 2006/0125803 | A1 | 6/2006 | Westerman et al. |
| 2006/0128457 | A1 | 6/2006 | Cannon |
| 2006/0135238 | A1 | 6/2006 | Lancaster et al. |
| 2006/0148565 | A1 | 7/2006 | Gauselmann et al. |
| 2006/0157928 | A1 | 7/2006 | O'Halloran |
| 2006/0170154 | A1 | 8/2006 | Matsuno et al. |
| 2006/0170155 | A1 | 8/2006 | Silverman |
| 2006/0197750 | A1 | 9/2006 | Kerr et al. |
| 2006/0197753 | A1 | 9/2006 | Hotelling |
| 2006/0237905 | A1 | 10/2006 | Nicely et al. |
| 2006/0238517 | A1 | 10/2006 | King et al. |
| 2006/0238518 | A1 | 10/2006 | Westerman et al. |
| 2006/0238519 | A1 | 10/2006 | Westerman et al. |
| 2006/0238520 | A1 | 10/2006 | Westerman et al. |
| 2006/0238521 | A1 | 10/2006 | Westerman et al. |
| 2006/0238522 | A1 | 10/2006 | Westerman et al. |
| 2006/0240887 | A1 | 10/2006 | Walker et al. |
| 2006/0249899 | A1 | 11/2006 | Lease |
| 2006/0284874 | A1 | 12/2006 | Wilson |
| 2006/0287053 | A1 | 12/2006 | Yokota |
| 2007/0054726 | A1 | 3/2007 | Muir et al. |
| 2007/0060321 | A1 | 3/2007 | Vasquez et al. |
| 2007/0069459 | A1 | 3/2007 | Guindulain Vidondo |
| 2007/0070050 | A1 | 3/2007 | Westerman et al. |
| 2007/0070051 | A1 | 3/2007 | Westerman et al. |
| 2007/0070052 | A1 | 3/2007 | Westerman et al. |
| 2007/0075488 | A1 | 4/2007 | Pececnik |
| 2007/0078919 | A1 | 4/2007 | Westerman et al. |
| 2007/0081726 | A1 | 4/2007 | Westerman et al. |
| 2007/0120320 | A1 | 5/2007 | Miltenberger et al. |
| 2007/0135203 | A1 | 6/2007 | Nicely |
| 2007/0135204 | A1 | 6/2007 | Nicely |
| 2007/0139395 | A1 | 6/2007 | Westerman et al. |
| 2007/0146336 | A1 | 6/2007 | Ording et al. |
| 2007/0152980 | A1 | 7/2007 | Kociendae et al. |
| 2007/0152984 | A1 | 7/2007 | Ording et al. |
| 2007/0155464 | A1 | 7/2007 | Baerlocher |
| 2007/0155481 | A1 | 7/2007 | Vancura et al. |
| 2007/0157089 | A1 | 7/2007 | Van Os et al. |
| 2007/0167206 | A1 | 7/2007 | Kirkutis |
| 2007/0177803 | A1 | 8/2007 | Elias et al. |
| 2007/0177804 | A1 | 8/2007 | Elias et al. |
| 2007/0188444 | A1 | 8/2007 | Vale et al. |
| 2007/0192550 | A1 | 8/2007 | Rodeheffer et al. |
| 2007/0213119 | A1 | 9/2007 | Baerlocher et al. |
| 2008/0020815 | A1 | 1/2008 | Lancaster et al. |
| 2008/0070674 | A1 | 3/2008 | Lancaster et al. |
| 2008/0076500 | A1 | 3/2008 | Lancaster et al. |
| 2008/0076581 | A1 | 3/2008 | Mattice et al. |
| 2008/0102934 | A1 | 5/2008 | Tan |
| 2008/0108406 | A1 | 5/2008 | Oberberger |
| 2008/0108425 | A1 | 5/2008 | Oberberger |
| 2008/0113759 | A1 | 5/2008 | Baerlocher |
| 2008/0132320 | A1 | 6/2008 | Rodgers |
| 2008/0182650 | A1 | 7/2008 | Randall et al. |
| 2008/0182655 | A1 | 7/2008 | DeWaal et al. |
| 2008/0194316 | A1 | 8/2008 | Baerlocher |
| 2008/0214280 | A1 | 9/2008 | Baerlocher |
| 2008/0318668 | A1 | 12/2008 | Ching et al. |
| 2009/0124383 | A1 | 5/2009 | Gadda et al. |
| 2009/0143141 | A1 | 6/2009 | Wells et al. |

FOREIGN PATENT DOCUMENTS

| | | |
|---|---|---|
| EP | 1226851 | 7/2002 |
| EP | 1671684 | 6/2006 |
| EP | 1710000 | 10/2006 |
| EP | 1721642 | 11/2006 |
| EP | 1736215 | 12/2006 |
| EP | 1769828 | 4/2007 |
| GB | 2358591 | 8/2001 |
| GB | 2395139 | 5/2004 |
| GB | 2431362 | 4/2007 |
| NZ | 0521900 | 8/1996 |
| WO | WO 96/25208 | 8/1996 |
| WO | WO 97/38766 | 10/1997 |

| | | |
|---|---|---|
| WO | WO 00/33269 | 6/2000 |
| WO | WO 03/025867 | 3/2003 |
| WO | WO 2006/015442 | 2/2006 |
| WO | WO 2006/061616 | 6/2006 |
| WO | WO 2006/078219 | 7/2006 |
| WO | WO 2006/094398 | 9/2006 |
| WO | WO 2006/097007 | 9/2006 |
| WO | WO 2007/024202 | 3/2007 |
| WO | WO 2007/033430 | 3/2007 |
| WO | WO 2007/077449 | 7/2007 |
| WO | WO 2008/045464 | 4/2008 |

OTHER PUBLICATIONS

U.S. Appl. No. 11/853,952, filed Sep. 28, 2007, Gerrard, et al.
U.S. Appl. No. 11/864,439, filed Sep. 28, 2007, Oberberger et al.
U.S. Appl. No. 11/873,948, filed Oct. 17, 2007, Zielinski.
U.S. Appl. No. 11/924,396, filed Oct. 25, 2007, Iddings.
U.S. Appl. No. 12/102,308, filed Apr. 14, 2008, Baerlocher.
Plinko description of Price is Right game from 1983, at http://gscentral.net/plinko.htm, Jan. 3, 1983.
A Day on the Surface: A Hands-On Look at Microsoft's New Computing Platform article printed from http://arstechnica.com/microsoft/news/2007/09/surface.ars/2 on Jan. 27, 2009.
The Price is Right Video Slots advertisement Featuring Plinko published by IGT, Jan. 27, 2009.
Multi-touch, Surface Computing, iPhone, and more . . . article printed from Just Good Design on Nov. 6, 2008.
Multitouch Interface Is Starting to Spread Among New Devices article printed in The Wall Street Journal on Jan. 31, 2008.
The Coffee Table that will Change the World, article printed in Popular Mechanics Magazine in Jul. 2007.
The Shape of Computers to Come article published in Wall Street Journal on May 30, 2007.

* cited by examiner

GAMING SYSTEM HAVING MULTIPLE PLAYER SIMULTANEOUS DISPLAY/INPUT DEVICE

PRIORITY

This application is a non-provisional of, claims the benefit of and priority to U.S. Provisional Application No. 60/986,870, filed Nov. 9, 2007, the entire contents of which is incorporated herein by reference.

CROSS REFERENCE TO RELATED APPLICATIONS

This application relates to the following co-pending commonly owned applications: "GAMING SYSTEM HAVING USER INTERFACE WITH UPLOADING AND DOWNLOADING CAPABILITY," Ser. No. 12/267,207, and "GAMING SYSTEM HAVING A DISPLAY/INPUT DEVICE CONFIGURED TO INTERACTIVELY OPERATE WITH EXTERNAL DEVICE," Ser. No. 12/267,120.

BACKGROUND

Known proposed wagering game tables are not able to create a sufficiently real life table gaming experience in which multiple players play in a same gaming area and share game play and other experiences. While proposed wagering game tables offer certain advantages in terms of game flexibility and heightened graphics, proposed game tables separate the players from one another using individual gaming devices or individual display screens (with separate touch screens or other input devices) for each player. One primary reason for this is that these separate player stations enable each of the players to make inputs (using their own separate touch screen or other input devices) at the same time or at nearly the same time. While certain game tables using so-called multi-touch systems have been proposed, these game tables do not fully provide a real life table gaming experience for multiple players.

Accordingly, a need exists for improved gaming systems that enable multiple players to simultaneously play shared integrated games more interactively and which provide a more real life table gaming experience.

SUMMARY

Various embodiments of the gaming system of the present disclosure provide a game table having a multiplayer interactive display/input device which enables multiple players to simultaneously play primary or base wagering games and/or secondary or bonus games. The display/input device enables multiple players to simultaneously interact with the gaming system, the game table and the various games using a common or the same display/input device. For example, the game table enables multiple players to manipulate displayed objects (such as cards or other game symbols) displayed by the display/input device at the same time. That is, the display/input device of the game table is configured to accept multiple inputs (such as touch inputs) from multiple players simultaneously. This enables the display/input device to simultaneously display the same game to multiple players in an integrated seamless manner without the need for multiple different sets of display devices and input devices for each player as in numerous previously proposed game tables.

Thus, in the preferred embodiment, the game table has a single multiplayer display/input device which all of the players use to play the game(s).

The display/input device in various embodiments is additionally configured to sense actions or movements made close to the surface of the display/input device. Thus, for example, in certain embodiments, the display/input device can discern between (a) the waving of a player's hand back and forth relative to the display/input device as one type of input by the player, and (b) a vertical movement of the player's hand up and down relative to the display/input device as a different type of input by the player. In various embodiments, the display/input device is configured to do this for multiple players at the same time.

Additionally, in various embodiments, the display/input device of the game table is configured to interact with one or more external objects such as external physical input devices (besides a player's hand) as described below.

These abilities to display multiple game functions and game symbols to multiple players at the same time on one display/input device, to receive multiple inputs from multiple players at the same time through the one display/input device, and to interact with external objects provides for seamless integrated game play much more like a live game table while providing the security and other advantages of an automated gaming system. This also provides for additional game play functionality and additional player interaction functionality as further discussed below in accordance with the present invention.

More specifically, one suitable table for the gaming system of the present disclosure is provided by Microsoft Corporation, Redmond, Wash., which uses a technology described in at least U.S. Pat. No. 7,204,428, the entire contents of which are incorporated herein by reference. This table is configured to simultaneously sense touches of multiple people and is also configured to sense coded patterns such as coded patterns applied to objects above the display/input surface of the table. This table is configured to identify the inputs by people and the objects when placed on the surface of the display/input device. This table is also configured to sense movements within a predefined distance above the table. In various embodiments of the present disclosure, the game table includes a plurality of infrared ("IR") video cameras on an opposite side of the display surface from the person or object. In various embodiments, one or more of the cameras are configured to detect reflected infrared ("IR") light received from or reflected by the person or a coded pattern printed on or attached to the object. In various embodiments, the coded pattern is an identifier of the object or part of the object as further described below. It should be appreciated that, as further described below, the coded pattern is passive in that the coded pattern does not send any electronic signal to the game table, but is rather identified by the game table.

The present disclosure contemplates using such game tables for displaying game symbols (such as cards, dice, etc.) and displaying game functions (such as bets required, outcomes and awards) to one or more players and for enabling one or more players and/or live dealers to simultaneously and/or sequentially interact with the game tables using their hands, or using other physical objects (such as playing cards, dice, or wagering chips) or other suitable input devices.

In one example embodiment, the one display/input device displays virtual cards for and the virtual chips of each of a plurality of players. The cameras operate with the displayed cards and displayed chips to sense when the displayed cards and the displayed chips are touched or moved by a player or dealer to accomplish a function in or related to a game. The processing and memory controlling the game table or gaming system are configured for this purpose. For example, the processing and memory are configured to enable a displayed card to be touched by a live dealer, who slides the displayed card from a position in front of the dealer to a position in front of the player such that it can be thereafter handled (such as moved or otherwise manipulated according to game rules) by the player. The processing and memory thereafter enable the player to manipulate the card in accordance with the game rules. Alternatively, the processing and memory are configured to provide a virtual dealer who deals the cards to the players. This facilitates game play in an integrated seamless manner between the dealer and all of the players in part because the cards and chips are seamlessly shown or displayed moving between the dealer and players without any interruption similar to a live game table.

In an example blackjack game embodiment, players take turns as the live dealer or virtual dealer moves across the game table. In one embodiment, the gaming system is programmed to move from player to player, making the current indicated player the active player and ignoring or disallowing certain or all actions taken by other players. Thus, a player who is not active at a point in time can try to make an input such as a "hit" or "stay" movement without actually inputting a decision (which causes an action) into the gaming system. In other words, at designated times the gaming system only recognizes inputs by one designated player and can ignore inputs by the other players. The display/input device in one embodiment indicates or highlights the active player (such as by brightening or enlarging that active player's cards, while dulling non-active cards). This indicating or highlighting lets each player playing at the game table know which player is the currently active player (i.e., the player whose turn it is), which player has just made a gaming decision, and which player is up next. This example embodiment shows how the game table enables the players to take turns making inputs through the same display/input device. It should be appreciated that the game table can also be configured to alternatively enable the two or more of the players to make such inputs simultaneously, and that a better gaming experience is provided with a single display/input device that displays all of the desired game functional elements to the players and enables the players to make such inputs through the same display/input device.

More specifically, in one embodiment, the multiplayer simultaneous display/input device enables a live dealer to "flip" a displayed card by tapping the displayed card in a particular sequence (such as twice in rapid succession), or at a particular portion of the card (such as one corner of the card). In a virtual dealer embodiment, the displayed cards can be flipped at designated times (such as one second after the dealer's last dealt card). In an alternative embodiment, the face-down cards are revealed automatically by a virtual dealer (such as at the end of a blackjack deal).

As alluded to above, in various embodiments, the game table enables the player to "hit" or "stay" by gesturing one way or the other above the display/input device of the game table. Alternatively, the game table enables the player to tap the display/input device to "hit." In another embodiment, the display/input device operates to display "hit" and "stay" input areas on the game table for each player. In certain embodiments as discussed above, the employed technique is disabled for each player until that player's turn to avoid inadvertent inputs or out of turn inputs. In other embodiments, the game table enables two or more of the players to simultaneously make inputs.

In certain embodiments where the game table or gaming system is programmed to detect side to side movement (such as one movement for "stay"), the game table orients itself and inputs from each player to detect side to side movement regardless of whether the player is facing north, south, east or west. In this manner, the game table enables different players to play at different ones of the game table's four sides or positions (when the display/input device of the game table is square or rectangular) or at a particular pie slice (when display/input device of the game table is circular or has a semicircular end or portion).

The multiplayer game table in certain embodiments also provides information features accessible to the players through the display/input device. For example, the game table can provide a player help feature, such as in the form of a displayed help button that appears for a player after a period or amount of player loss. When the player has a decision to make (such as to "hit" or "stay"), the player can make an input using the displayed button after which the gaming system responds in an appropriate manner such as "odds say hit" or "odds say stay." In other embodiments, the game table provides other custom features for the players such as a "me" button that enables the players to each customize his/her playing area by interacting with the display/input device (such as by selecting a color, background, pictures for brightness, loudness, etc. for the player's play area).

The multiplayer game table of the present disclosure in various embodiments provides one or more secondary or bonus games in addition to the primary or base wagering game(s). In one embodiment, the display/input device provides a single bonus game for all of the players. In other embodiments, the display/input device provides individual bonus games for each of one or more of the players. The display/input device thus can be configured to enable multiple players to play one or more bonus games simultaneously through the same display/input device. In certain embodiments, the bonus games are interactive (i.e., one or more of the players may be required to make inputs for one or more of the bonus games.) In one such embodiment, the bonus game can be played simultaneously on the same display/input device by multiple players where the bonus game simultaneously interacts with the players. For example, the gaming system employing the display/input device can provide displayed or virtual items or tokens to the players during plays of primary games for collection by the players and for use in a bonus game. In one such example embodiment, when the bonus game begins, the players each move their bonus items to one or more bonus game areas of the display/input device, after which the gaming system assumes control of the items and uses the items in the bonus game to determine outcomes and awards for each of the participating players.

The gaming system, in various embodiments, uses one or more random number generators ("RNG") to determine bonus outcomes. Alternatively, the gaming system uses a virtual physics engine to randomly determine the bonus outcomes to make the game table feel more like a real game table to the players. For example, the physics engine can mathematically predict where each of the player's bonus item lands (such as on a bonus display such as a spinning wheel, pinball platform, or other displayed mechanical platform) based on various suitable factors (such as initial velocity, assumed mass, volume, shape and material hardness of an item, angles at which the item hits different obstructions on the wheel, platform, etc., and speed of the wheel, platform, etc.). In such embodiments, the bonus item therefore appears to move and bounce substantially as it would in a mechanical configuration. This provides a more real life feel to such games and enables the game table to provide an experience more like a completely live game table. In such embodiments, the results are randomly determined, but not by an RNG. It should be appreciated that when using the physics engine, the sizes, shapes and other factors of the displayed components of the game determines or at least in part determines the odds and probabilities for generating outcomes. For example, if one section of a displayed wheel is bigger than another section, the bigger section is more likely to be selected. It should also be appreciated that such methods for determining outcomes can also be used in certain primary or base games displayed by the game table and in other bonus games.

The bonus game, in various embodiments, is based on or uses base game outcomes. For example, the gaming system in one embodiment provides a bonus outcome such as a bonus ball to the player who obtains a designated accumulation event such as the highest blackjack hand without busting in a play of the primary blackjack game at the game table. In the case of a tie between two or more players, the gaming system can award no bonus balls, can award both players bonus balls, can use a suitable tie breaker determination or provide another suitable solution. It should be appreciated that in the embodiments which employ a tie breaker, the gaming system can use any suitable tie breaker such as: (a) the tied player with the highest wager wins the bonus ball, (b) the tied player who has drawn the most cards in the blackjack game wins the bonus ball, or (c) the tied player with the certain designated features in their hand wins the bonus ball. It should also be appreciated that in certain embodiments the display/input device simultaneously shows each player's accumulated bonus outcomes (such as bonus tokens or balls) while continuing to display plays of the primary game for each of the players. In further embodiments, the accumulated bonus outcomes such as bonus balls can be displayed in other suitable manners such as after each play of the primary game(s) or on other display devices associated with the game table.

Continuing with the above example, as discussed above, a high hand wins the bonus outcome (such as the bonus token or ball) in one embodiment. In certain embodiments, this is so regardless of whether each player is placing a side bet or not. Thus, in such embodiments, the players compete against other players. In other embodiments, only players placing a side wager or other designated wager level can win the bonus outcome (such as the bonus token or ball). In certain such embodiments, the players compete against only the other players who have made such a wager. In other embodiments, players need to beat all of the other players to obtain a bonus outcome (such as a bonus token or ball). In one such embodiment, players who did not make a designated wager can not win a bonus outcome (such as the bonus token or ball).

Further continuing with this example embodiment, only players who place a side bet are eligible to win bonus outcomes (such as bonus tokens or balls). The gaming system in one such embodiment builds a progressive pot at least in part using side bet funds. Upon a triggering condition or event (such as randomly determined, after a certain number of bonus tokens or balls are provided to players or when the progressive pot grows to a certain size), the gaming system transfers into or enters a bonus mode and the display/input device displays the bonus game instead of the virtual blackjack or other primary game configuration. The bonus game in this example embodiment includes a displayed bonus wheel and the display/input device enables each of the players to place their accumulated displayed bonus outcomes (such as bonus tokens or balls) on the displayed bonus wheel. In one embodiment, the display/input device enables each of the players to place their bonus outcomes (such as bonus tokens or balls) on the bonus wheel by moving their outcomes (such as bonus tokens or balls) with their hands. In one embodiment, at least one of the players can at least partially control the movement of the wheel by grabbing or touching a displayed slice or section of the displayed wheel or a displayed handle of the displayed wheel and push the slice, section or handle to impart an angular velocity to the displayed wheel. The outcomes (such as bonus tokens or balls) are displayed moving around (such as bouncing around), hitting the wheel and each other and are each eventually displayed moving such or falling into a position such as a slot that corresponds to a particular prize or award or result. It should be appreciated that the result can be a losing result or a result that does not provide any award to the player. The gaming system then provides each player any designated awards corresponding to where their outcomes (such as bonus tokens or balls) move to or land.

It should be appreciated that playing the bonus game presents an interesting dynamic to the underlying blackjack game in various embodiments. For example, a player who would normally "stay" on a particular hand may be enticed to hit to build a larger hand for the bonus token or ball. It should be appreciated from the above description that such primary and bonus games are particularly enhanced by the multi-player game table where the players interact with the display/input device.

Continuing with the above example, if less than all spots at the game table are full, the bonus game in one embodiment uses the number of players available. In certain such embodiments, the side bet is not an option for only a single player. In alternative embodiments, the display/input device plays "ghost" hands for the unfilled positions. Thus, if then game table seats four players but only two are being played, the gaming system plays two "ghost hands" to fill out the game table. This evens the odds for any number of players and also facilitates the situation where only a single player places the bonus side bets. It should also be appreciated that the game table can be configured to change the displayed player display area for each player and any central display area based on the number of players playing the game.

In another alternative of the above example, a number (such as three) "ghost" hands are dealt regardless of how many stations at the game table are filled by players. Thus, if all four positions at a rectangular version of the game table are filled, the gaming system deals seven hands. Each player that placed the side bet to qualify for bonus outcomes has to beat each of the extra "ghost" hands; although it should be appreciated that ties amongst winners can be as discussed herein or in other suitable manners.

In one embodiment, the player can place a side bet on the player's own hand or another player's hand. Thus, in a four player game, each player could place a side bet on the same player's hand. In one such embodiment, in the case of a tie, all four players receive a bonus outcome (such as a bonus ball) if the hand they bet on wins. It should also be appreciated that alternative embodiments can be employed to ensure that only a designated number such as one bonus outcome is delivered in each play of the primary game. It should be appreciated that in various such example embodiments, the bonus outcome could be given to a randomly determined hand from the tied hands, or hands could be ranked based on card suit and rank. For example, a twenty comprised of 2 kings could beat a twenty comprised of a jack-queen combination. It should be appreciated that other methods for generating bonus outcomes may be employed.

In one alternative embodiment, the gaming system enables one or more physical input devices to interact with the bonus game. In one such example embodiment, the physical input device includes a handle, a dial, or other suitable devices configured to be placed in association with the bonus display such as in the middle of the displayed wheel. One of the players actuates (such by spinning) the handle to set the initial angular velocity of the displayed wheel. It should also be appreciated that one or more other suitable physical input devices may be employed in conjunction with the operation of the bonus game (as well as for operation of a suitable base or primary game). It should thus be appreciated that the present disclosure contemplates providing a mechanical or physical input device which is separate from the game table or display/input device and which enables the player to interact with the display/input device and the primary and/or secondary games displayed by the display/input device.

The gaming system in various embodiments also includes one or more overhead displays that interact with the game table, such as to show each player's number of accumulated bonus outcomes (such as bonus tokens or balls) or other game elements. In certain embodiments, this frees up space to maximize the surface for base game play on the game table. It should be appreciated that the gaming system can use the overhead display(s) in other suitable manners.

It is therefore an advantage of gaming system of the present disclosure to provide an automated gaming system having a display/input device that enables multiple players to play a wagering game simultaneously in a seamless integrated manner.

Another advantage of the present disclosure is to provide a gaming system having a display/input device that enables sequential player control and gaming control of the movement of a displayed object such as a game functional element.

Another advantage of the present disclosure is to provide a gaming system having a display/input device that enables sequential machine control and player control of the movement of a displayed object such as a game functional element.

Another advantage of the present disclosure is to provide a gaming system having a display/input device that enables simultaneous control of the movement of multiple displayed objects such as game functional elements by multiple players.

Another advantage of the present disclosure is to provide a gaming system having a display/input device that enables simultaneous control of the movement of multiple displayed objects such as game functional elements by multiple players.

Another advantage of the present disclosure is to provide a gaming system having a display/input device that enables sequential person to person control of a displayed object such as game functional element.

Another advantage of the present disclosure is to provide a gaming system having a display/input device programmed to enable a displayed object such as a game functional element to be flipped or otherwise revealed.

Another advantage of the present disclosure is to provide a gaming system having a display/input device configured to detect differences in player movement for game play.

Further advantages of the present disclosure are to detect side-to-side movement of a player above a game table, cause the game table to re-orient itself to detect side-to-side movement regardless of whether the player is facing north, south east or west, and to cause the game table that can read up and down player movement without the player having to contact the game table.

Another advantage of the present disclosure is to provide a gaming system having a bonus game that is optional for each player, but that takes into account game play by each player regardless of whether they are playing the bonus.

Another advantage of the present disclosure is to provide a gaming system having a bonus game that the player can choose to play on certain game plays but not on other game plays, wherein the player can still affect the outcome of the bonus game.

Additional features and advantages are described herein, and will be apparent from, the following Detailed Description and the figures.

DETAILED DESCRIPTION

Figure 1:
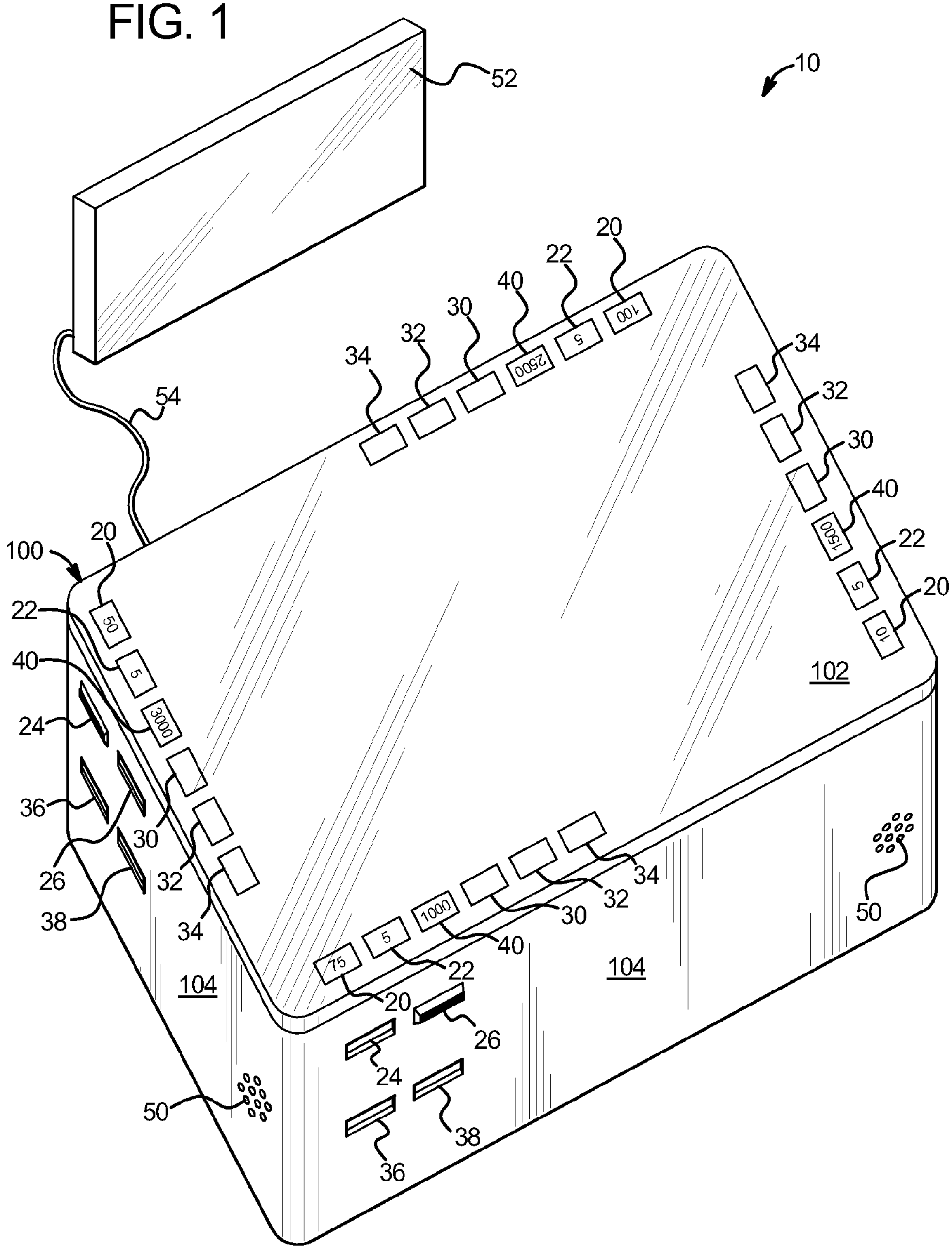
FIG. 1 is a perspective view of one embodiment of a gaming system having a single multiple player simultaneous display/input device game table of the present disclosure.

Referring now to the drawings, gaming system 10 as shown in FIG. 1 is one embodiment a multiple player simultaneous display/input device gaming system of the present disclosure. Gaming system 10 may be implemented in various configurations including but not limited to: (1) a dedicated gaming system in which the computerized instructions for controlling any games (which are provided by the gaming system) are provided with the gaming system prior to delivery to a gaming establishment; and (2) a changeable gaming system in which the computerized instructions for controlling any games (which are provided by the gaming system) are downloadable to the gaming system through a data network after the gaming system is installed at a gaming establishment.

In one embodiment, the computerized instructions for controlling any games are executed by at least one central server, central controller, or remote host. In such a "thin client" embodiment, the central server remotely controls any games (or other suitable interfaces), and gaming system is utilized to display such games (or suitable interfaces) and receive one or more inputs or commands from one or more players.

In another embodiment, the computerized instructions for controlling any games are communicated from the central server, central controller, or remote host to a gaming system local processing and memory. In such a "thick client" embodiment, gaming system local processing executes the communicated computerized instructions to control any games (or other suitable interfaces) provided to a player.

In one embodiment, one or more gaming systems in a network of multiple gaming systems may be a thin client gaming system and one or more gaming system in the network may be a thick client gaming system. In another embodiment, certain functions of gaming system are implemented in a thin client environment and certain other functions of gaming system are implemented in a thick client environment. In one such embodiment, computerized instructions for controlling any primary games are communicated from the central server to gaming system in a thick client configuration and computerized instructions for controlling any secondary games or bonus functions are executed by a central server in a thin client configuration.

The gaming system 10 includes a game table having a support structure, housing, or cabinet, which provides support for a multi-touch display/input device and other features needed for a gaming machine. It is configured so that a player can operate it while standing or sitting. It should be appreciated that the game table can be configured in other suitable manners.

Figure 2A:
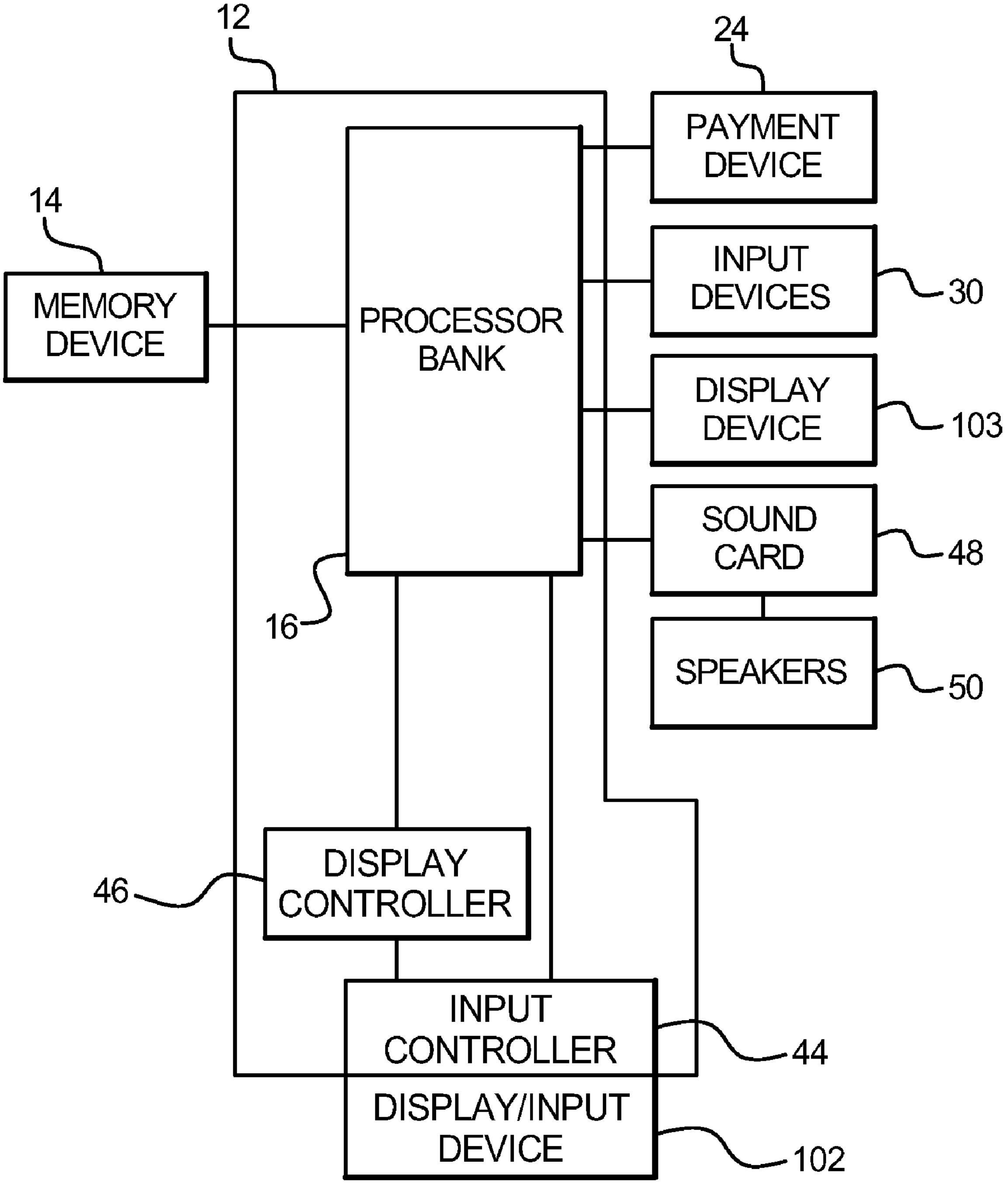
FIG. 2A is a schematic view of one embodiment for an electrical configuration for the multiple player simultaneous display/input device game table of the present disclosure.

As seen additionally in FIG. 2A, gaming system 10 includes a plurality of processors or processor bank 16, which can for example include a primary processor in communication with a plurality of delegate processors. For purposes of this description, "processing 12" refers to the entire processing apparatus and functioning, including the multiple individual processors of bank 16. The individual processors can be any suitable combination of microprocessors, integrated circuits or application-specific integrated circuits ("ASIC's"). Processing 12 is in communication with or operable to access or to exchange signals with at least one data storage or memory device. For purposes of this description, "memory 14" refers to the entire memory or storage apparatus and its functioning, including multiple individual memory devices. In one embodiment, processing 12 and memory 14 reside within a multiple player game table 100 that enables multiple players to input information simultaneously into gaming system 10.

Memory 14 stores program code and instructions, executable by processing 12, to control gaming system 10. Memory 14 also stores other data such as image data, event data, player input data, random or pseudo-random number generators, physics engine, pay-table data or information, and applicable game rules that relate to the play of gaming system 10. In one embodiment, memory 14 includes any one or more of random access memory ("RAM"), which can include non-volatile RAM ("NVRAM"), magnetic RAM ("MRAM"), ferroelectric RAM ("FeRAM"), and other forms as commonly understood in the gaming industry, read only memory ("ROM"), flash memory and/or electrically erasable programmable read only memory ("EEPROM").

In one embodiment, part or all of the program code and/or operating data described above can be stored in a detachable or removable memory device, including, but not limited to, a suitable cartridge, disk, compact disk ("CD") ROM, digital video disk ("DVD"), or universal serial port ("USB") memory device. In other embodiments, part or all of the program code and/or operating data described above can be downloaded to memory 14 through a network.

In one embodiment, gaming system 10 is operable over a wireless network, for example as part of a wireless gaming system. It should be appreciated that a gaming system may be a device that has obtained approval from a regulatory gaming commission or a device that has not obtained approval from a regulatory gaming commission.

In various embodiments, gaming system 10 randomly generates awards and/or other game outcomes based on probability data. In one such embodiment, this random determination is made via a random number generator ("RNG"), such as a true random number generator, a pseudo random number generator, physics engine, or other suitable randomization process. In one embodiment, each award or other game outcome is associated with a probability, wherein gaming system 10 generates the award or other game outcome to be provided to the player based on the associated probabilities. Here, since gaming system 10 generates outcomes randomly or based upon one or more probability calculation, there is no certainty that gaming system 10 will ever provide the player with any specific award or other game outcome.

In another embodiment, as discussed in more detail below, gaming system 10 employs a predetermined or finite set or pool of awards or other game outcomes. Here, as each award or other game outcome is provided to the player, gaming system 10 flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

One suitable table for gaming system 10 of the present disclosure is provided by Microsoft Corporation, Redmond, Wash., which uses a technology described in U.S. Pat. No. 7,204,428 ("the '428 patent). This so-called surface computing technology employs an acrylic top and a plurality of infrared cameras and a DLP projector with WI-FI™ and BLUETOOTH™ wireless networks to display and detect objects and movement. As players move their hands or objects on or above the table top, the cameras translate the motions into commands. BLUETOOTH is a trademark of Bluetooth SIG, Inc. In certain embodiments, the technology includes the application of a coded pattern applied to an external object. The interactive display/input device identifies the object when it is on the surface of display/input device 102 of the table 100. More specifically, gaming system 10 includes a plurality of infrared ("IR") video cameras located beneath surface of display/input device 102, on an opposite side of the display/input device surface from the object. The cameras detect reflected infrared ("IR") light received from a coded pattern printed on the object such as a playing card or dice. The coded pattern is in various example embodiments a circular printed pattern, a linear printed pattern, a single level matrix printed pattern, a multi-level matrix printed pattern, a variable bit length matrix printed pattern, a black/white (i.e., binary) printed pattern, a gray scale pattern printed, or other suitable pattern disposed on the object. The coded pattern can be applied to any suitable object (such as a playing card or dice) for interaction with the game table. The coded pattern is an identifier of the object. For example, the identifier can tell processing 12 and memory 14 operable with the plurality of cameras that the object is a particular playing card, particular dice face, a particular token, or particular wagering or other chip. It should also be appreciated that the coded pattern can be applied to other object such as player gloves and player charms. It should further be appreciated that in the future the display/input device of the game table can be further refined to identify a player's personal identification such as the player's finger prints and that the gaming system can be configured to compare such identifications to identifications in a database.

It should be appreciated that the coded patterns are passive in the sense that they do not send or transmit any electrical signals to the display/input device of the game table. Rather, the display/input device is configured to identify (such as by reading or sensing) the coded pattern based on the light reflected from the coded pattern. It should further be appreciated that the coded pattern can be printed on or attached to a device that includes a transmitter and a receiver that are capable of sending electronic signals to and receiving electronic signals from the gaming system or game table. Thus, while such devices are not considered passive with respect to the transmission of such electronic signals, such coded patterns on such device are considered passive. It should also be appreciated that other suitable devices which provide passive image recognition may be employed in accordance with the present disclosure.

In certain embodiments, objects such are cards, dice, chips and wheels are displayed by the game table 100 of gaming system 10. The cameras operate to sense when the displayed cards have been touched by a player or dealer. Processing 12 and memory 14 of game table 100 are modified for this purpose. For example, processing 12 and memory 14 are modified to allow a card or dice to be touched by an actual dealer, who slides the card to the player, and thereafter be handled by the player. Alternatively, processing 12 and memory 14 are configured to provide a virtual dealer who deals a card to the player, and thereafter enable the player to manipulate the displayed card.

Game table 100 displays a primary game, which is a multiple player or player versus player game in one embodiment. Game table 100 may also display any suitable secondary or bonus game associated with the primary game as well as information relating to the primary or secondary game.

As seen in FIG. 1, gaming system 10 for each player includes a credit display 20, which displays a player's current number of credits, cash, account balance, or the equivalent. Gaming system 10 can also display a bet display 22 for each player, which displays a player's amount wagered. In one embodiment, as described in more detail below, gaming system 10 includes a player tracking display 40 for each player, which displays information regarding a player's play tracking status. In one embodiment, game table 100 only shows the above displays 20, 22 and/or 40 at certain times such as between hands of blackjack, so that surface of display/input device 102 of game table 100 can be conserved for base or bonus play.

For the base and bonus games, game table 100 of gaming system 10 is configured to display at least one and a plurality of game or other suitable images, symbols and indicia such as any visual representation or exhibition of the movement of objects such as virtual or video reels and wheels, dice, cards, dynamic lighting, video images, images of people, characters, places, things, faces of cards, and the like.

Any desired player item displayed on game table 100 can be touched, dragged, and resized if it is desirable to do so. Multiple players can touch and move multiple displayed objects simultaneously as discussed above and below. Further, processing 12 and memory 14 are configured such that items can be under control of gaming system 10 at one time and position and be under control of one of the players at another time and position. Other indicia, such as manufacturer label and game name, may be displayed as desired or permanently at one or more positions on game table 100.

As seen in FIG. 1, gaming system 10 in one embodiment includes a secondary such as a large overhead display device 52, which is configured to communicate with game table 100 wirelessly or via a cable 54. Large overhead display device 52 can be seen by each of the players playing gaming system 10 and by nearby patrons. Secondary display device 52 can show any desired information relating to a primary or bonus game being played at game table 100, credit information, player tracking information and/or player attraction indicia.

As illustrated in FIGS. 1 and 2A, in one embodiment, gaming system 10 includes at least one payment device 24 such as a separate payment device 24 for each player, in communication with processing 12. As seen in FIG. 1, a payment device 24 can be a note, ticket or bill acceptor in which the player inserts paper money, a ticket or voucher. Game table 100 can alternatively or additionally include a coin slot 26 in which the player inserts money, coins or tokens. Further alternatively, game table 100 can include a reader or validator for credit cards, debit cards or credit slips for payment acceptance. In one embodiment, a player may insert an identification card into a card reader of gaming system 10, which can be a smart card having a programmed microchip or a magnetic strip encoded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to gaming system 10. In one embodiment, money may be transferred to a gaming device through an electronic funds transfer. When a player funds gaming system 10, processing 12 determines the amount of funds entered and displays the corresponding amount on the credit or other suitable display as described above.

As seen in FIGS. 1 and 2A, in one embodiment gaming system 10 includes a plurality virtual or electromechanical of game table input devices, such as a bet one button 30 in communication with processing 12. The game table input devices enable the player to produce an input signal, which is received by processing 12. Game table 100 provides a bet one button 30 to place a bet. The player can increase the bet by one credit each time the player pushes the bet one button 30. When the player pushes the bet one button 30, the number of credits shown in the credit display decreases by one, and the number of credits shown in the bet display increases by one. In another embodiment, one input device is a bet max button (not shown) which enables the player to bet the maximum wager permitted for a game of gaming system 10 in one button push.

For individual gaming, after appropriate funding of gaming system 10, the player uses a game activation device, such as a play button 32, to start any primary game or sequence of events in gaming system 10. Play button 32 can be any suitable play activator such as a bet one button, a max bet button, or a repeat the bet button. In one embodiment, e.g., for multiple player gaming, upon appropriate funding, gaming system 10 begins the game play automatically. In another embodiment, multiple play buttons 32, e.g., one for each player are provided, wherein game play begins when any player touches his/her play buttons 32.

Game table 100 can also include a cash out button 34, e.g., one for each player. Each player can push the cash out button 34 and cash out to receive a cash payment or other suitable form of payment corresponding to the number of remaining credits. In one embodiment, when the player cashes out, a payment device, such as a ticket, payment, or note generator

36 prints or otherwise generates a ticket or credit slip to provide to the player. The player receives the ticket or credit slip and redeems the value associated with the ticket or credit slip via a cashier (or other suitable redemption system). In another embodiment, when the player cashes out, the player receives the coins or tokens in a coin payout tray (not shown). Alternatively or additionally, gaming system 10 funds credits to each player's electronically recordable identification card.

Game table 100 provides a multi-touch display/input device, which can employ, for example, the technology set forth in the '428 patent. As seen in the diagrammatic example of FIG. 2A, the display/input device 102 is controlled by a suitable controller 44, which is part of processing 12. The display/input device 102 and the controller 44 are connected to a display controller 46, which is also part of processing 12. Multiple players can make decisions and input signals simultaneously into gaming system 10 by touching device (or the surface of device) 102 at the appropriate locations.

In addition to the display/input device, it should also be appreciated that certain of the input devices 103 discussed above can be provided as touch-screen inputs or as electromechanical inputs located on one or more of the sides 104 of game table 100. It should also be appreciated that if in touch-screen form, the function(s) of any of these input devices can be alternatively provided by the display/input device 102.

Gaming system 10 may further include a plurality of communication ports for enabling communication of processing 12 with external peripherals, such as external video sources, expansion buses, game or other displays, a SCSI port, or a keypad. As illustrated, gaming system 10 optionally includes a remote, e.g., large overhead display device 52, which can display certain features of the base or bonus game, e.g., show how many bonus chips or items each player has accumulated.

In one embodiment, as seen in FIG. 2A, gaming system 10 includes a sound generating device controlled by one or more sounds cards 48, which is part of processing 12, and is operable with a sound generating device, such as a speaker 50. Sound card 48 and speaker 50 can play music for the primary and/or secondary game and for other modes of gaming system 10, such as an attract mode. In one embodiment, gaming system 10 provides dynamic sounds coupled with attractive multimedia images displayed on game table 100 to provide an audio-visual representation or to otherwise display full-motion video with sound to attract players to gaming system 10. During idle periods, gaming system 10 may display a sequence of audio and/or visual attraction messages to attract potential players to gaming system 10. The videos may be customized according to a game theme associated with gaming system 10.

Figure 2B:
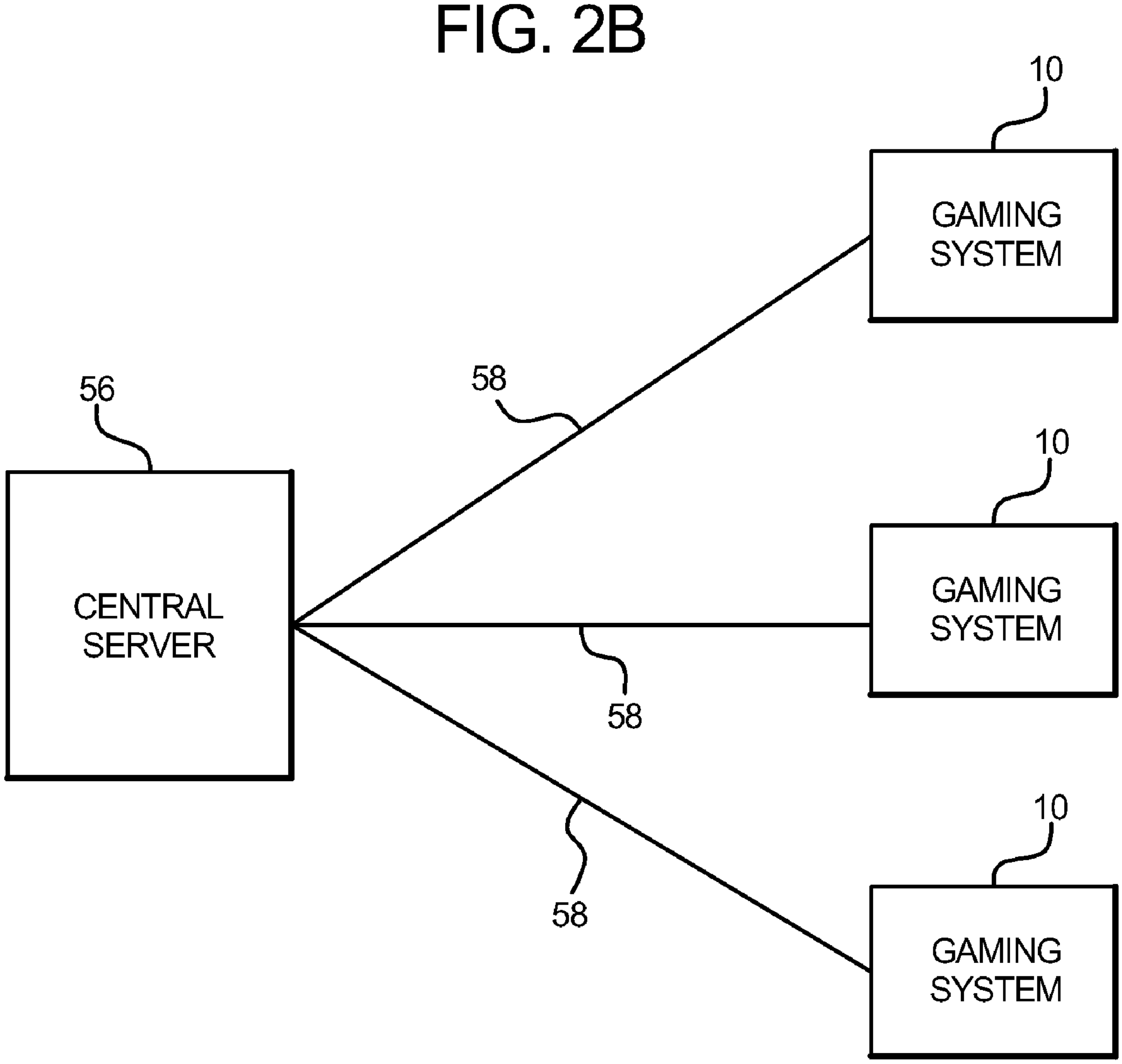
FIG. 2B is a schematic view of one embodiment for a server based configuration networking a plurality of the multiple player simultaneous display/input device game tables of the present disclosure.

In one embodiment, as illustrated in FIG. 2B, one or more of the gaming systems 10 is in communication with each other and/or at least one central server, central controller or remote host 56 through a data network or remote communication link 58. In this embodiment, the central server, central controller or remote host 56 is a server or computing device that includes at least one processor and at least one memory or storage device. In such embodiments, the central server 56 is a progressive controller or a processor of one of gaming systems 10 in the network. In these embodiments, processing 12 of each gaming system 10 is designed to transmit and receive events, messages, commands, or any other suitable data or signal between individual gaming systems 10 and central server 56. Processing 12 of gaming system 10 is configured to execute the above communicated events, messages or commands in conjunction with the operation of gaming system 10. Moreover, processing 12 of central server 56 is configured to transmit and receive events, messages, commands or any other suitable data or signal between central server 56 and each of the individual gaming systems 10. The central server processor is operable to execute such communicated events, messages or commands in conjunction with the operation of central server 56. It should be appreciated that one, more or each of the functions of the central server 56 as disclosed herein may be performed alternatively at processing 12. It should be further appreciated that one, more or each of the functions of processing 12 may be performed by the central server processing.

In one embodiment, the game outcome provided to the player is determined by central server 56 and provided to the player(s) at gaming system 10. Here, each of a plurality of such gaming systems 10 is in communication with central server 56. Upon a player initiating game play at one of gaming systems 10, the initiated gaming system 10 communicates a game outcome request to the central server 56.

In one embodiment, the central server 56 receives the game outcome request and randomly generates a game outcome for the primary game based on probability data. In another embodiment, central server 56 generates a game outcome randomly for the secondary game based on probability data. Here, central server 56 generates a game outcome randomly for both the primary game and the secondary game based on probability data. In this embodiment, the central server 56 is capable of storing and using program code or other data similar to processing 12 and memory 14 of gaming system 10.

In an alternative embodiment, central server 56 maintains one or more predetermined pools or sets of predetermined game outcomes. Here, the central server 56 receives the game outcome request and independently selects a predetermined game outcome from a set or pool of game outcomes. Central server 56 flags or marks the selected game outcome as used. Once a game outcome is flagged as used, it is prevented from further selection from the set or pool and cannot be selected by central server 56 upon another wager. The provided game outcome can include a primary game outcome, a secondary game outcome, primary and secondary game outcomes, or a series of game outcomes such as free games.

Central server 56 communicates the generated or selected game outcome to the initiated gaming system 10. Gaming system 10 receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by central server 56 and communicated to the initiated gaming system 10 to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno or lottery game. Here, each individual gaming system 10 uses one or more bingo, keno, or lottery game to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming system 10 is enrolled in the bingo game, such as upon an appropriate wager or engaging an input device, the enrolled gaming system 10 is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards, while another element may solely be present on one of the bingo cards.

In operation of these embodiments, upon providing or associating a different bingo card with each of a plurality of enrolled gaming systems 10, central server 56 randomly selects or draws, one at a time, a plurality of the elements. As each element is selected, a determination is made for each gaming system 10 as to whether the selected element is present on the bingo card provided to that enrolled gaming system 10. This determination can be made at central server 56, gaming system 10, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined pattern is marked on one or more of the provided bingo cards. It should be appreciated that in one embodiment, gaming system 10 requires the player to engage a daub button (not shown) to initiate the process of gaming system 10 marking or flagging any selected elements.

After one or more predetermined pattern is marked on one or more of the provided bingo cards, a game outcome is determined for each of the enrolled gaming system 10 based, at least in part, on the selected elements on the provided bingo cards. As described above, the game outcome determined for each gaming system 10 enrolled in the bingo game is used by that gaming system 10 to determine the predetermined game outcome provided to the player. For example, a first gaming system 10 to have selected elements marked in a predetermined pattern is provided a first outcome of win $10, which is provided to a first player regardless of how the first player plays in a first game, and a second gaming system 10 to have selected elements marked in a different predetermined pattern is provided a second outcome of win $2, which is provided to a second player regardless of how the second player plays a second game. It should be appreciated that as the process of marking selected elements continues until one or more predetermined pattern is marked, this embodiment ensures that at least one bingo card wins the bingo game and thus at least one enrolled gaming system 10 provides a predetermined winning game outcome to a player. It should be appreciated that other suitable methods for selecting or determining one or more predetermined game outcome may be employed.

In one example of the above-described embodiment, the predetermined game outcome may be based on a supplemental award in addition to any award provided for winning the bingo game as described above. Here, if one or more element is marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming system 10 may be provided a supplemental or intermittent award regardless of whether the enrolled gaming system's provided bingo card wins or does not win the bingo game as described above.

In another embodiment, one or more of gaming systems 10 is in communication with central server 56 for monitoring purposes only. That is, each individual gaming system 10 randomly generates the game outcomes to be provided to the player, and the central server 56 monitors the activities and events occurring on the plurality of gaming systems 10. In one embodiment, the gaming network includes a real-time or on-line accounting and gaming information system coupled operably to central server 56. The accounting and gaming information system of this embodiment includes a player database for storing player profiles, a player tracking module for tracking players and a credit system for providing automated casino transactions.

In one embodiment, gaming system 10 is associated with or otherwise integrated with one or more player tracking system. Player tracking systems enable gaming establishments to recognize the value of customer loyalty through identifying frequent customers and rewarding them for their patronage. In one embodiment, gaming system 10 and/or the player tracking system tracks any player's gaming activity at gaming system 10. In one such embodiment, gaming system 10 includes at least one card reader 38, located, e.g., at a side 104 of game table 100, which is in communication with processing 12. Here, a player is issued a player identification card that has an encoded player identification number that uniquely identifies the player. When a player inserts their playing tracking card into card reader 38 to begin a gaming session, card reader 38 reads the player identification number off the player tracking card to identify the player. Gaming system 10 and/or the associated player tracking system timely tracks information or data relating to the identified player's gaming session.

Directly or via the central server 56, processing 12 of gaming system 10 communicates such information to the player tracking system. Gaming system 10 and/or associated player tracking system also timely tracks when a player removes their player tracking card when concluding play for that gaming session. In another embodiment, rather than requiring a player to insert a player tracking card, gaming system 10 uses one or more portable device carried by a player, such as a cell phone, a radio frequency identification tag or any other suitable wireless device to track when a player begins and ends a gaming session. In another embodiment, gaming system 10 utilizes any suitable biometric technology or ticket technology to track when a player begins and ends a gaming session.

It should also be appreciated that the current player tracking cards can be modified to be read by the IR cameras. For example, the player tracking cards can include an IR tag instead of or in addition to the magnetic strip currently on the card readers.

During one or more gaming session, the player tracking system tracks player information or data, such as any amounts wagered, average wager amounts, and/or the time at which these wagers are placed. In different embodiments, for one or more player, the player tracking system includes the player's account number, the player's card number, the player's first name, the player's surname, the player's preferred name, the player's player tracking ranking, any promotional status associated with the player's player tracking card, the player's address, the player's birthday, the player's anniversary, the player's recent gaming sessions or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service window (not shown), which is displayed on surface of display/input device 102 of game table 100.

In one embodiment, a plurality of gaming systems 10 are capable of being connected together through a data network. In one embodiment, the data network is a local area network ("LAN"), in a plurality of gaming systems 10 are located proximate to each other and an on-site central server or controller as in, for example, a gaming establishment or a portion of a gaming establishment. In another embodiment, the data network is a wide area network ("WAN"), in which a plurality of the gaming systems 10 are in communication with at least one off-site central server. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. Here, operation of gaming system 10 and accumulation of credits may be accomplished with only a connection to the central server 56 (the internet/intranet server) through a conventional phone or other data transmission line, digital subscriber line (DSL), T-1 line, coaxial cable, fiber optic cable, or other suitable connection. Players may access an internet game page from any location in which an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices is in communication with a central server 56. In one embodiment, the memory of central server 56 stores different game programs and instructions, executable by gaming system processing 12, to control gaming system 10. Each executable game program represents a different game or type of game, which may be played on one or more gaming system 10 in the network. Such different games may include the same or substantially the same game play with different pay tables. In different embodiments, the executable game program is for a primary game, a secondary game or both. In another embodiment, the game program may be executed as a secondary game to be played simultaneous with the play of a primary game (which may be downloaded to or fixed on gaming system 10) or vice versa.

In operation, central server 56 communicates one or more of the stored game programs to local processing 12 of at least one gaming system 10. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet or telephone line. After the stored game programs are communicated from the central server 56, local processing 12 executes the communicated program to facilitate play of the communicated program by a player through game table 100 of gaming system 10. That is, when a game program is communicated to local processing 12, the local processing changes the game or type of game played at gaming system 10.

In another embodiment, a plurality of gaming systems 10 at one or more gaming site are networked to central server 56 in a progressive configuration, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming systems 10 distributed throughout a number of properties at different geographical locations including, for example, different locations within a city or different cities within a state.

In one embodiment, the progressive gaming system host site computer is maintained for the overall operation and control of the progressive gaming system. Here, a progressive gaming system host site computer oversees the entire progressive gaming system and is the master for computing all progressive jackpots. All participating gaming sites report to, and receive information from, the progressive gaming system host site computer. Each central server 56 is responsible for all data communication between gaming system 10 hardware and software and the progressive gaming system host site computer. In one embodiment, an individual gaming system 10 may trigger a progressive award win. In another embodiment, a central server 56 (or the progressive gaming system host site computer) determines when a progressive award win is triggered. In a further embodiment, an individual gaming system 10 and a central server 56 (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, gaming system 10 is randomly or apparently randomly selected to provide a player of that gaming system one or more progressive award. In one such embodiment, gaming system 10 does not provide any apparent reason to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards is each funded via a side bet or side wager. Here, a player places or wagers a side bet to be eligible to win the progressive award associated with the side bet. In one embodiment, the player has to place the maximum bet and the side bet to be eligible to win one of the progressive awards. In another embodiment, if the player places or wagers the required side bet, the player may wager any credit amount during the primary game (the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of gaming system 10, via a gaming establishment or via any suitable manner.

In another embodiment, one or more of the progressive awards is partially funded via a side-bet or side-wager which the player may make (and which may be tracked via a side-bet meter). In a further embodiment, one or more of the progressive awards is funded with only side-bets or side-wagers placed. In still another embodiment, one or more of the progressive awards is funded based on players' wagers as described above as well as any side-bets or side-wagers placed.

In still a further alternative embodiment, a minimum wager level is required for a gaming system 10 to qualify to be selected to obtain one of the progressive awards. In one embodiment, this minimum wager level is the maximum wager level for the primary game in gaming system 10. In another embodiment, no minimum wager level is required for a gaming machine to qualify to be selected to obtain one of the progressive awards.

As described in more detail below, a plurality of players at a plurality of linked gaming systems 10 participate in a group gaming environment. In one embodiment, a plurality of players at a plurality of linked gaming systems work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming systems 10 compete against one another for one or more awards. In one such embodiment, a plurality of players at a plurality of linked gaming systems 10 participate in a gaming tournament for one or more awards. In another embodiment, a plurality of players at a plurality of linked gaming systems 10 play for one or more award, wherein an outcome generated by one gaming system 10 affects the outcomes generated by one or more other linked gaming system.

Gaming system 10 can incorporate any suitable wagering game as the primary or base game. The primary or base game may comprise a single player game, such as a reel-type game, card game, cascading or falling symbol game, number game, or other game of chance that can be configured in an electronic form, which in one embodiment produces a random outcome based on probability data at the time of or after placement of a wager. Gaming system 10 can be configured to play video poker, video blackjack, video keno, video bingo or baccarat, for example, in single player format or in table game format, e.g., multiple blackjack players against a dealer or multiple poker players playing against one another.

In one embodiment, gaming system 10 displays a slot game that may be a base or bonus game for the gaming system. In the slot game of gaming system 10, game table 100 displays multiple paylines, which may be horizontal, vertical, circular, diagonal, angled or any combination thereof. The paylines operate with at least one reel, such as three to five reels. Each reel includes a plurality of indicia or symbols, such as bells, hearts, fruits, numbers, letters, bars, or other images which correspond to a theme associated with gaming system 10. In another embodiment, one or more of the reels are independent reels or unisymbol reels. In this embodiment, each independent or unisymbol reel generates and displays one symbol to the player. The slot version of gaming system 10 awards prizes after the reels stop spinning if specified types and/or configurations of indicia or symbols occur on an active payline.

In an alternative embodiment, rather than determining any outcome to provide to the player by analyzing the symbols generated on any wagered upon paylines as described above, gaming system 10 determines any outcome to provide to the player based on the number of associated symbols which are generated in active symbol positions on the requisite number of adjacent reels (i.e., not on paylines passing through any displayed winning symbol combinations). Here, if a winning symbol combination is generated on the reels, gaming system 10 provides the player one award for that occurrence of the generated winning symbol combination. For example, if one winning symbol combination is generated on the reels, gaming system 10 provides a single award to the player for that winning symbol combination (e.g., not based on the number of paylines that would have passed through that winning symbol combination). Here, the slot game may provide the player more than one award for the same occurrence of a single winning symbol combination (e.g., if a plurality of paylines each pass through the same winning symbol combination).

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of gaming system 10 with at least one symbol generated in an active symbol position. For example, a three reel gaming system 10 with three symbols generated in active symbol positions on each reel includes twenty-seven ways to win (e.g., three symbols on the first reel×three symbols on the second reel×three symbols on the third reel). A four reel gaming system 10 with three symbols generated in active symbol positions on each reel includes eighty-one ways to win (e.g., three symbols on the first reel×three symbols on the second reel×three symbols on the third reel×three symbols on the fourth reel). A five reel gaming system 10 with three symbols generated in active symbol positions on each reel includes 243 ways to win (e.g., three symbols on the first reel×three symbols on the second reel×three symbols on the third reel×three symbols on the fourth reel×three symbols on the fifth reel). It should be appreciated that modifying the number of generated symbols by either modifying the number of reels or modifying the number of symbols generated in active symbol positions by one or more of the reels modifies the number of ways to win.

In another embodiment, the slot version of gaming system 10 enables a player to wager on and thus activate symbol positions. In one such embodiment, the symbol positions are on the reels. Here, if based on the player's wager, a reel is activated, then each of the symbol positions of that reel is activated and each of the active symbol positions is part of one or more of the ways to win. In another embodiment, if based on the player's wager, a reel is not activated, then a designated number of default symbol positions, such as a single symbol position of the middle row of the reel, is activated and the default symbol position(s) is/are part of one or more of the ways to win. This type of gaming machine enables a player to wager on one, more than one, or all of the reels of gaming system 10. Processing 12 uses the number of wagered-on reels to determine the active symbol positions and the number of possible ways to win.

In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment in which a player wagers on one or more reel, a player's wager of one credit may activate each of the three symbol positions on a first reel, wherein one default symbol position is activated on each of the remaining four reels. In this example, as described above, the slot version of gaming system 10 provides the player three ways to win (e.g., three symbols on the first reel×one symbol on the second reel×one symbol on the third reel×one symbol on the fourth reel×one symbol on the fifth reel). In another example, a player's wager of nine credits activates each of the three symbol positions on a first reel, each of the three symbol positions on a second reel and each of the three symbol positions on a third reel, wherein one default symbol position is activated on each of the remaining two reels. In this example, as described above, gaming system 10 provides the player twenty-seven ways to win (e.g., three symbols on the first reel×three symbols on the second reel×three symbols on the third reel×one symbol on the fourth reel×one symbol on the fifth reel).

In one embodiment, to determine any award(s) to provide to the player based on the generated symbols, gaming system 10 individually determines if a symbol generated in an active symbol position on a first reel forms part of a winning symbol combination with or is otherwise suitably related to a symbol generated in an active symbol position on a second reel. Here, gaming system 10 classifies each pair of symbols that form part of a winning symbol combination (e.g., each pair of related symbols) as a string of related symbols. For example, if active symbol positions include a first cherry symbol generated in the top row of a first reel and a second cherry symbol generated in the bottom row of a second reel, gaming system 10 classifies the two cherry symbols as a string of related symbols because the two cherry symbols form part of a winning symbol combination.

After determining if any strings of related symbols are formed between the symbols on the first reel and the symbols on the second reel, gaming system 10 determines if any of the symbols from the next adjacent reel should be added to any of the formed strings of related symbols. Here, for a first of the classified strings of related symbols, gaming system 10 determines if any of the symbols generated by the next adjacent reel form part of a winning symbol combination or are otherwise related to the symbols of the first string of related symbols. If gaming system 10 determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the slot version of gaming system 10 adds the related cherry symbol generated on the third reel to the previously classified string of cherry symbols.

On the other hand, if gaming system 10 determines that no symbols generated on the next adjacent reel are related to the symbols of the first string of related symbols, the slot version of gaming system 10 marks or flags such string of related symbols as complete. For example, if the first string of related symbols is the string of related cherry symbols and none of the symbols of the third reel are related to the cherry symbols of the previously classified string of cherry symbols, gaming system 10 marks or flags the string of two cherry symbols as complete.

After either adding a related symbol to the first string of related symbols or marking the first string of related symbols as complete, the slot version of gaming system 10 proceeds as described above for each of the remaining classified strings of related symbols which were previously classified or formed from related symbols on the first and second reels.

After analyzing each of the remaining strings of related symbols, the slot version of gaming system 10 determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, gaming system 10 marks each of the remaining pending strings of related symbols as complete.

When each of the strings of related symbols is marked complete, the slot version of gaming system 10 compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

Poker Game Example Embodiments

In one embodiment, game table 100 of gaming system 10 displays a poker game, in which the player plays a conventional game of video draw poker and initially deals five cards all face up from a virtual deck of fifty-two cards. Cards may be dealt as in a traditional game of cards, e.g., from the top of the deck or the cards may be randomly selected from a predetermined number of cards. If the player wishes to draw a card, the player selects the cards to hold via the display/input devices. The player presses a deal button, which can be virtual and the unwanted or discarded cards are removed from surface of display/input device 102 of game table 100. The poker version of gaming system 10 deals the replacement cards from the remaining cards in the deck. This results in a final five-card hand. Gaming system 10 compares the final five-card hand to a payout table which utilizes conventional poker hand rankings to determine the winning hands. Gaming system 10 provides the player with an award based on a winning hand and the number of credits the player wagered.

In another embodiment, the poker version of gaming device 100 plays a multi-hand version of video poker. Here, gaming system 10 deals the player at least two hands of cards. In one embodiment each hand of cards is associated with its own deck of cards. The player chooses the cards to hold in a primary hand. The held cards in the primary hand are also held in the other hands of cards. The remaining non-held cards are removed from each hand displayed and replacement cards are dealt randomly into each hand. Since the replacement cards are dealt randomly and independently for each hand, the replacement cards for each hand can and usually will be different. The poker hand rankings are then determined hand by hand against a payout table and awards are provided to the player.

As discussed herein, game table 100 is particularly well-suited for multiple player, interactive gaming in which multiple players play at the same time against a dealer or against each other. It is accordingly expressly contemplated to provide a video poker game on interactive game table 100 in which players play against each other. A deck of cards moves from player to player, each player taking turns as dealer. Alternatively, a separate (actual or virtual dealer) deals the cards to the group of players. The dealing of virtual cards is discussed in detail below.

The poker game can be any suitable poker game. For example, the poker game can be a five card stud game in which four cards are dealt face-up. The players then raise or fold. The fifth card is then dealt face-up and the winning player is awarded the pot.

Figure 3:
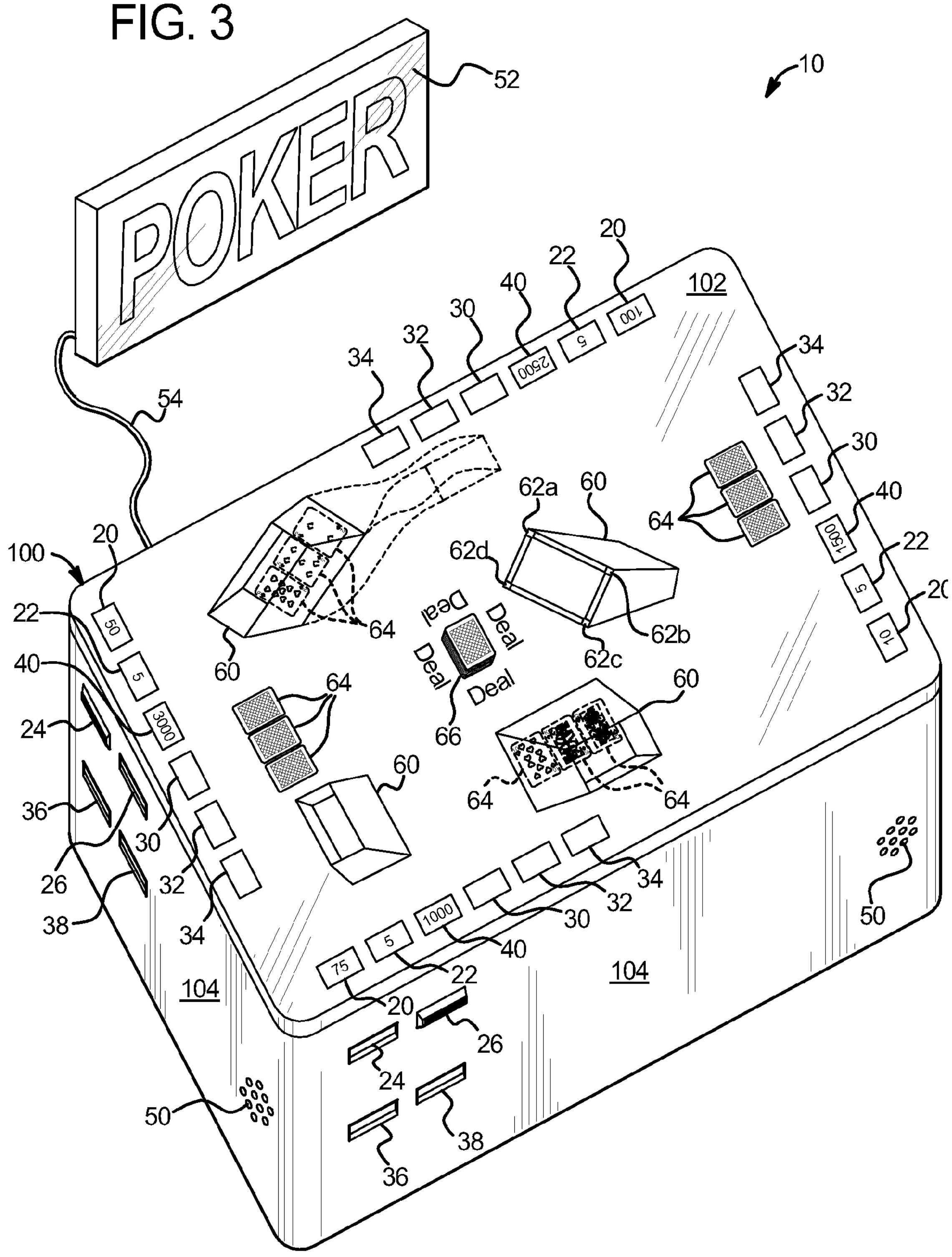
FIG. 3 is a perspective view of one embodiment of a gaming system having the multiple player simultaneous display/input device game table of the present disclosure operating a poker game.

Referring now to FIG. 3, in an alternative embodiment, cards can be dealt in a poker game face-down. The embodiment shows a transition from game table control to player of the movement of cards. The player can move the cards by touching the cards or be using an external physical viewing device to move the cards. Further, multiple players can move their cards at the same time via either method above. Processing 12 of game table 100 facilitates this multitasking. The viewer 60 also illustrates use of an external physical device operable with game table 100, which modifies the game of game table 100 and also works in conjunction with features displayed by the game table.

In the poker game of FIG. 3, gaming system 10 via game table 100 deals virtual cards 64 face down to each player, which game table 100 can provide or snap to a designated position of surface of display/input device 102 in front of each player. Each player has a viewer 60, having four separate encodings 62*a* to 62*d* such as the RF encodings discussed above and in relation to the '428 patent. The encoding or tags 62*a* to 62*d* herein can be for example radio frequency tags, barcode tags, and dot coded tags.

The encodings are located at the bottom corners of viewer 60 as generally seen in FIG. 3. Game system 10 knows where cards 64 are located. Each player can move their cards 64, which in one embodiment travel together, e.g., two or three at a time, such that the cards 64 cannot be moved towards or away from each other. Game table 100 deals a second face-down card 64, which is provided or snaps into position next to the first face down card 64, deals the third face-down card 64 so that it is provided or snaps into position next to the first and second face-down cards 64, and so on.

Game table 100 is configured to sense when the four encodings 62*a* to 62*d* of viewer 60 are centered around face-down cards 64, such that viewer 60 blocks the view of cards 64 to all except the player having such cards. To this end, in the illustrated embodiment viewer 60 is tilted and narrowed as necessary to enable the player see cards 64 readily while blocking the cards 64 from the other players and nearby patrons.

Once viewer 60 is centered over the face-down cards, game table 100 reveals the cards 64 within the viewer to the player holding the cards 64. If the player moves viewer 60 while centered over the face-down cards 64, the cards move with the viewer 60. As soon as any of the encodings 62*a* to 62*d* is not sensed to be at its appropriate position, game table 100 masks or hides cards 64 (simulating turning the cards back over). Using viewer 60 and game table 100 configured as discussed above, gaming system 10 can provide any suitable type of face-down poker game, including a table poker game in which players play against each other.

The poker game of FIG. 3 highlights various capabilities or functionality of gaming system 10 and game table 100. Game table 100 controls the movement of cards 64 from the deck 66 of cards 64 to the different dealt positions in front of the players. Afterwards, control of the movement of cards 64 is relinquished to the player. Cards 64 can be moved by touching the cards or by placing viewer 60 over the cards and moving the viewer. The game table 100 enables players to move their cards 64 simultaneously via either of such methods. Multiple IR cameras within game table 100 enable multiple inputs to be made to the game table at the same time. Processing 12 within game table 100 is configured to perform multiple tasks simultaneously, e.g., enable multiple viewers/card hands to be moved simultaneously.

Keno Game Example Embodiments

In one embodiment, game table 100 of gaming system 10 displays a keno game which includes a plurality of selectable indicia or numbers on game table 100. Here, the player selects at least one of the selectable indicia or numbers via an input device such as a touch screen. Gaming system 10 then displays a series of drawn numbers and determines an amount of matches, if any, between the player's selected numbers and gaming system 10's drawn numbers. The player is provided an award based on the amount of matches, if any, between the player's picked numbers and the game's drawn numbers and the total number of numbers picked by the player.

As discussed herein, game table 100 is particularly well-suited for multiple players, interactive gaming in which multiple players play at the same time against a dealer or against each other. In one embodiment, multiple players play against the same house draw. In single player keno, game table 100 can be configured to let the player touch a number to select it after which the number is highlighted somehow. With multiple players, the same number can be marked in two ways if two players select the number and so on.

Figure 4:
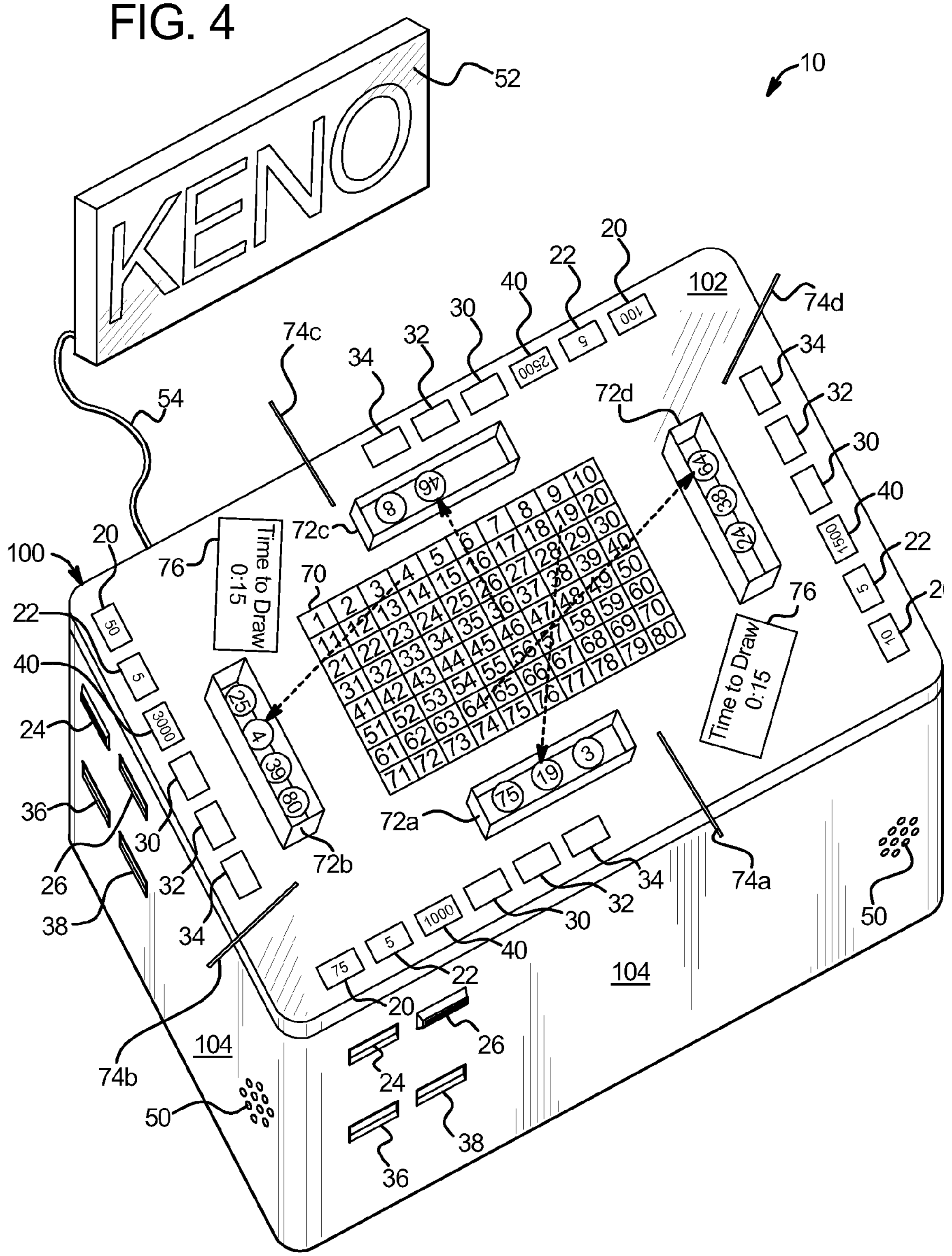
FIG. 4 is a perspective view of one embodiment of a gaming system having the multiple player simultaneous display/input device game table of the present disclosure operating a keno game.

Referring now to FIG. 4, an alternative keno game highlights various capabilities or functionality of gaming system 10. The game enables players to make keno picks simultaneously using the same surface of display/input device 102 of game table 100. In this illustrated embodiment, the game table 100 enables each player to move the player's own number collection station or "basket" to a desirable area on surface of display/input device 102 near the player. Also common displays, such as time remaining until draw display 76, can be moved to any suitable position on surface of display/input device 102 desired by the players collectively. Game table 100 therefore enables game-by-game customization of the display and input of information.

In the keno game of FIG. 4, each player can grab a copy of any desired number from a virtual number array 70 and slide the number copies into the player's virtual basket 72*a* to 72*d*, leaving the original of the number at the number array 70. If the player lifts the player's hand from surface of display/input device 102 before the number copy reaches the basket, the number copy either disappears or snaps back to the original of the number at array 70. Alternatively, the number copy can sit at the position at which it has been left for a period of time or up until gaming system 10 begins to draw numbers. As that time arrives, the number copy can flash for a few seconds to prompt the player. A player can slide a number copy out of his/her basket 72*a* to 72*d*, at which time it either disappears or snaps back to the original. If a player slides the same number copy into his/her basket 72*a* to 72*d*, gaming system 10 can either ignore the later selected copy or consider it an increase in the player's wager.

Game table 100 is configured such that a player can drag a copy of a particular number over the original of another number located in number array 70 without selecting that other number. If the player's finger does not provide enough resolution given the spacing of numbers within array 70, gaming system 10 can be provided with suitable wands 74*a* to 74*d*, respectively, for each player. Each wand may have a tag or have an encoded tip. The tag or encoded tip can be provided if for example the casino or manufacturer does not want players using non-authorized wands.

Gaming system 10 highlights its drawn numbers at array 70. Any number in the player's basket 72*a* to 72*d* that matches a number drawn by gaming system 10 is highlighted to show the player that the match has occurred. The matched numbers at the end of the draw are counted and each player is paid according to a paytable.

The keno game of FIG. 4 highlights various capabilities or functionality of gaming system 10. Here, the game can, but does not have to, be sequential. The keno game in one embodiment enables the players to independently choose when to pick desired keno numbers up until the time of the draw, shown in time displays 76. There is no set sequence, which enhances player interaction as the players crisscross each other to pick their numbers. Virtual baskets 72*a* to 72*d* can be moved to any position on surface of display/input device 102 desired by the players. Game table 100 also enables displays 76 to be moved to positions that are acceptable to the players collectively.

Bonus Game Embodiments

In various embodiments, in addition to winning credits or other awards in a base or primary game, gaming system 10 also provide players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. The triggering of one bonus game for gaming system 10 via game play is discussed in detail below. In other embodiments, the triggering event or qualifying condition occurs based on exceeding a certain amount of game play (such as number of games, number of credits, amount of time), or reaching a specified number of points earned during game play.

In another embodiment, processing 12 of gaming system 10 or a central server 56 (see FIG. 2B discussed above) provides the player one or more plays of one or more secondary games randomly. In one such embodiment, gaming system 10 does not provide any apparent reason to the player for qualifying to play a secondary or bonus game. Here, qualifying for a bonus game is not triggered by an event in or based specifically on any of the plays of any primary game. That is, gaming system 10 may simply qualify a player to play a secondary game without any explanation or alternatively with simple explanations. In another embodiment, gaming system 10 (or central server 56) qualifies a player for a secondary game at least partially based on a game triggered or symbol triggered event, such as at least partially based on the play of a primary game.

In one embodiment, gaming system 10 includes a program which begins automatically a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player. One example of a "buy-in" discussed below is a side bet. The player must make a separate side-wager on the bonus game or wager a designated amount in the primary game to qualify for the secondary game.

Blackjack Game With Bonus Example Embodiments

Figure 5:
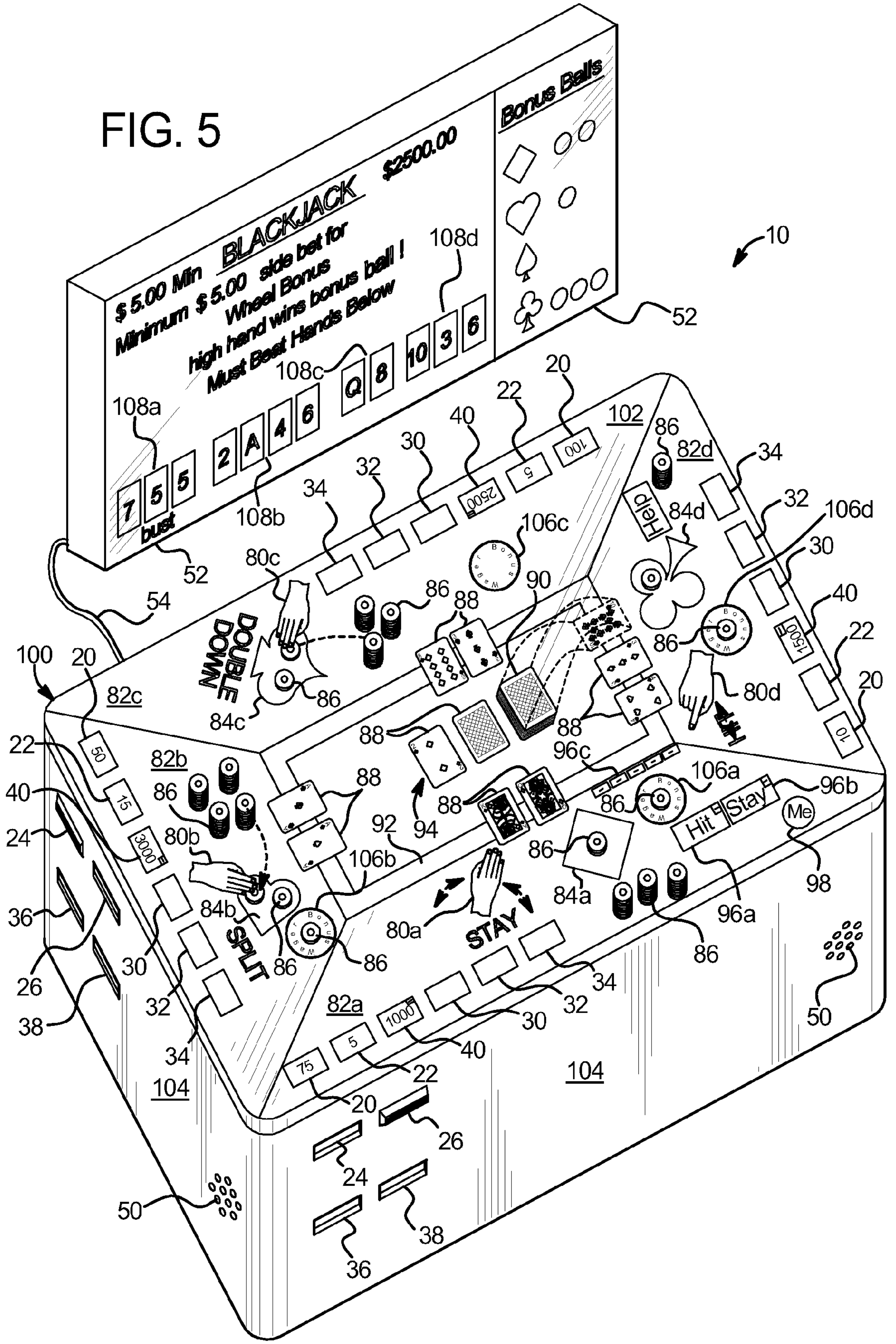
FIG. 5 is a perspective view of one embodiment of a gaming system having the multiple player simultaneous display/input device game table of the present disclosure operating a blackjack base game having a bonus game.

More specifically, referring now to FIG. 5, one example of how the game table of the present disclosure can be employed is shown by the embodiment of a blackjack game using example game table 100. The blackjack game illustrates simultaneous game play on a single display/input device of game table 100. The blackjack game illustrates the concept of dividing certain areas for each player and enabling each player to customize his or her area as well as being the only player allowed to input changes in the area. The blackjack game illustrates a transition from game control of the movement of game items to game control of such items. The blackjack game also illustrates space optimization of surface of display/input device 102 of game table 100, including displayed chips, game pieces and input devices that can be minimized. The displayed chips can be "handled" or moved singly or in bulk. The game via game table 100 is played using many of the same methods as live game table blackjack such placing an additional chip to double down or split (such as by gestures or movements by a player).

One example embodiment of a blackjack game using game table 100 is illustrated in FIG. 5. Here, four players 80*a*, 80*b*, 80*c* and 80*d* play the blackjack game simultaneously, each player having a corresponding quadrant 82*a*, 82*b*, 82*c* and 82*d* of surface of display/input device 102. Player 80*a* is the diamond player and places his or her bet on moveable diamond wager placement area 84*a*. Player 80*b* is the heart player and places his or her bet on moveable heart wager placement area 84*b*. Player 80*c* is the spade player and places his or her bet on moveable spade wager placement area 84*c*. Player 80*d* is the clubs player and places his or her bet on moveable clubs wager placement area 84*d*. Each wager placement area 84*a* to 84*d* is moveable only within each player's quadrant 82*a* to 82*d* respectively, in one embodiment. Example wager placement areas 84*a* to 84*d* are displayed in the illustrated embodiment.

While game table 100 is shown as a rectangle with four separations or playing stations 82*a* to 82*d*, game table 100 can have a different (such as a square, circular, oblong or elliptical) shape. Such shapes can be divided into any desired number of separations or playing stations 82*a* to 82*d* and can change based on the number of players playing. For example, if only two players are playing, game table 100 is divided into two sections; if five players are playing, game table 100 is divided into five sections; and so on until reaching a maximum number of players. In certain embodiments, "Add Player" and "Subtract Player" buttons or a keypad input (which can be minimized as described below) are provided to increase or decrease the number of playing stations.

Each player has a plurality of displayed chips 86, which are placed in stacks. For example, for a $5.00 minimum table, a player cashing in $20.00 will get a stack of four chips 86. A player cashing in $100.00 can get for example two stacks of 10 chips. In various embodiments, the displayed chips appear in three-dimensions with bottom chips appearing to be under surface of display/input device 102. The three-dimensional images are customized for each player's position as illustrated in this example, so that the images are oriented properly for the different positions at game table 100.

Game table 100 deals virtual cards 88 from virtual deck 90 onto deal rail 92. Typically, players are not supposed to touch their cards in blackjack, so cards 88 are not moveable once dealt in one embodiment. FIG. 5 illustrates a card 88 being dealt from deck 90 to player 80*d*. Game table 100 slides the card off of the deck into the proper position on rail 92. As the sliding takes place or once the card reaches rail 92, game table 100 reveals the card to the player.

Game table 100 also deals the dealer's virtual hand 94. A first card is dealt face-down, and second card is dealt face-up adjacent to the face-down card to form the dealer hand 94 as shown. The blackjack game proceeds sequentially such as beginning with diamond player 80*a*. Upon being dealt a king and a queen, player 80*a* decides to stay. To do so, player 80*a* moves his or her hand side-to-side above surface of display/input device 102 as illustrated, within quadrant 82*a*, which at this time is the only active quadrant. In one embodiment, one or more IR capable cameras or readers beneath surface of display/input device 102 detect the player's hand moving side to side without the player having to actually touch the surface of display/input device 102. In various embodiments, actions taken in other quadrants 82 (referring collectively to remaining quadrants) are ignored or not allowed.

Game table 100 then activates quadrant 82*b* for heart player 80*b*. Active quadrants are indicated or highlighted such as brightened in. Non-active quadrants can be dulled or deemphasized. Upon being dealt a pair of aces, player 80*b* decides to split the pair. To do so, player 80*b* moves a displayed chip 86 from one of his or her piles to wager placement area 84*b* as illustrated, located within quadrant 82*b*, which at this time is the only active quadrant. Actions taken in other quadrants 82 (referring collectively to remaining quadrants) are ignored or not allowed.

In one embodiment, placing the player's finger directly over but not touching the surface of display/input device 102 highlights the top chip and causes the top chip 86 to follow the player's finger to wager placement area 84*b*, where it is snapped into position. Touching the pile of chips 86 highlights the entire stack, which can then be moved as a stack to different parts of the player's quadrant or to the wager placement area. In one embodiment, the player can move his or her chips within the respective quadrant while it is non-active but cannot wager the chips. Even when a quadrant is active, an invalid additional wager attempt is ignored, e.g., the displayed chips are not allowed to enter the wager placement area.

In another embodiment, touching a stack of chips once causes the top chip to be highlighted and be moveable. The number "1" can appear on the top chip. Touching a stack of chips twice in succession causes the two top chips 86 to be highlighted and be moveable. The number "2" can appear on the top chip, and so on. Once the number of taps exceeds the number of chips 86 in a stack, no chips are highlighted so that the player can undue a wager decision.

Game table 100 then activates quadrant 82*c* for spade player 80*c*. Upon being dealt a three and an eight, player 80*c* decides to double down. To do so player 80*c* moves a displayed chip 86 from one of his or her piles to wager placement area 84*c* as illustrated, located within quadrant 82*c*, which at this time is the only active quadrant. Actions taken in other quadrants 82 (referring collectively to remaining quadrants) are ignored or not allowed in this example embodiment, although multiple different player actions can be facilitated in other embodiments.

The quadrants as illustrated provide a visual confirm message, e.g., "stay", "split", "double down" and "hit" to confirm the player's choice and to provide a hand-shake like message to the player that game table 100 understands the player's intent. In one embodiment, the player can remove a chip 86 from a wager placement area after placing the chip in the area until the player moves his or her hand off of the chip and away from the wager placement area, after which the bet is made and credit meter 20 and bet meter 22 are updated accordingly. The above mentioned "split" or "double down" confirm messages are shown as soon as the chip begin to enter the wager placement area, so that the player is made aware that game table 100 is about to accept the wager.

Game table 100 then activates quadrant 82*d* for clubs player 80*d*. Upon being dealt a four and a three, player 80*d* decides to hit. To do so, player 80*d* moves his or her hand up and down above surface of display/input device 102 as illustrated, within quadrant 82*d*, which at this time is the only active quadrant. One or more IR capable cameras or readers beneath surface of display/input device 102 detect the player's hand moving up and down without the player having to actually touch surface of display/input device 102. Actions taken in other quadrants 82 (referring collectively to remaining quadrants) are ignored or not allowed. Confirm message "hit" enables game table 100 to hand-shake with the player letting the player know that an additional card, here a ten is going to be dealt.

Quadrant 82*a* shows an alternative apparatus and method for the player to "hit" or "stay." Game table 100 provides a "hit" button 96*a*, which the player can press for an additional card. Game table provides a "stay" button 96*b*, which the player can press to not accept another card. "Hit" button 96*a* and "stay" button 96*b* each include a minimize symbol "–", which the player can press to cause the associated button to become minimized. It is contemplated to provide a number of options that are normally minimized to conserve surface of display/input device 102 as a bank of expand symbols "+" 96*c* (here along the playing side of deal bar 92). The player can press any of the expand symbols 96*c* to enlarge the symbol to a button and activate the function of the button. When the player no longer wishes to have the button enabled, the player pressed minimize symbol "–", after which the corresponding expand symbol "+" 96*c* appears at its designated position along the bank of symbols 96. Symbols 96 can be color coded. Maintaining consistent positioning of the symbols in the bank also enables players to become familiar with the symbols quickly.

In various embodiments, the game table provides extra functionality to each player through one or more further inputs. For example, "Me" button 98 (which can also be minimized) enables the player to customize the player stations 82*a* to 82*d*. For example, pressing "Me" button 98 can enable the player to change game symbols, such as from the heart to a favorite sports or school logo, change background color, set background, e.g., from a menu of backgrounds, change loudness of sound from speakers 50, or changes brightness. "Me" button 98 can also provide help to a player when deciding to hit or stay (which may be always available or only when player has lost a certain amount or has only a certain amount of credits or chips remaining, since game system 10 knows how many credits the player has). In various embodiments, such extra inputs enable multiple players to each perform extra activities while playing the primary or secondary game on the same display/input device. These extra activities can range from playing side games to using the internet. It should be appreciated that the "me" button can also enable the player to access an player account such as a player tracking account. Each player's account can store any suitable information regarding or for the player such as, but not limited to, player preferences, favorite games, and favorite table layout, configurations or colors. It should also be appreciated that in certain embodiments, the "me" button enables the player to access non-gaming concierge functions, such as placing food and/or beverage order, securing a reservation at a restaurant, or purchasing show tickets.

As discussed herein, game table 100 can be used to provide interactive and exciting bonus games in addition to the base games, such as the blackjack game just described. In the embodiment illustrated in FIG. 5, the bonus game requires that the players win bonus outcomes or tokens such as bonus balls in base blackjack play. In this example, the bonus game and blackjack game interact, and the bonus game can affect the player's play in the primary blackjack game certain situations as discussed below.

The following describes various embodiments of such example bonus game, however it should be appreciated that the game table disclosed herein can use the features described herein in alternative manners.

In this illustrated example, to be eligible to win a bonus ball, the player has to place a side wager, which overhead display 52 informs is $5.00 (or the minimum blackjack be per hand). Each player 80*a* to 80*d* places a side bet in bonus wager area 106*a* to 106*d*, respectively, in the same manner described above for placing the blackjack wager. The player pulls a chip 86 off of one of the player's chip piles and places it in bonus wager area 106*a* to 106*d*.

As shown by display 52, the player having the high hand (without busting) wins a bonus ball, the use of which is described below. In one embodiment, no bonus ball is awarded when multiple players tie for the high hand (bonus balls can accumulate until a single person obtains the high hand). In another embodiment, each player who ties for the high hand wins a bonus ball. In a further embodiment, the player who ties for the high hand and wins a playoff wins the bonus ball. The player who places a higher base game wager or who draws the most cards in the blackjack game wins the playoff for example.

In one embodiment, the player also has to beat the dealer to win a bonus ball. Thus, there is no incentive not to try to beat the dealer in this embodiment. An incentive may exist however to beat another player in this example embodiment. Thus, if the dealer is showing a six and has to get at least seventeen, player 80*a* has stayed at fourteen, and player 80*b* has thirteen, player 80*b* may take another hit to beat player 80*a* even though the player might otherwise stay, thinking that dealer will bust.

In another embodiment, the player does not have to beat the dealer to win a bonus ball. Here, there may be an incentive not to try to beat the dealer in addition to the above incentive to beat another player. If player 80*d* is the last player in the sequence and has a high hand of sixteen and dealer is showing a king, the player may decide to stay at the high hand, take the bonus ball and forgo a chance to increase the player's hand even though the dealer is likely to have a high hand beating sixteen. It should be appreciated that any other suitable game may be employed to accumulate bonus outcomes, tokens, or balls.

In either case above, it is advantageous to play last in the sequence (i.e., be on third base), thus it is contemplated in one embodiment to rotate the first deal to the player's sequentially (e.g., player 80*a* is dealt first in a first game, player 80*b* is dealt first in the second game, and so on). Displaying the deck in the middle of game table 100 facilitates such rotation.

As seen in FIG. 5, spade player 80*c* is not placing a side bet, however, player 80*c* is counted in determining high hand for the award of a bonus ball. Thus, side bet players 80*a*, 80*b*, and 80*d* have to beat player 80*c* to win a bonus ball.

In one embodiment, when game table 100 is less than full, the bonus ball is still awarded to the high player unless only a single player is playing (which may discourage single players). Overhead display 52 of FIG. 5 illustrates an alternative embodiment in which each player competes against "ghost" hands 108*a* to 108*d* displayed on the display. Thus, even if only a single player is playing gaming system 10, the player still plays against a full lineup of other hands.

Here, a tie with the highest ghost hand 108*a* to 108*d* can result in no bonus ball. Alternatively, a tie with the high ghost hand 108*a* to 108*d* can result in a bonus ball for the winner automatically or a playoff (may be desirable if ghost hands played according to optimal play algorithm), e.g., more cards drawn wins. Alternatively, (for any tie situation) cards can eventually be dealt to each tied hand, high cards win, until a winner is determined.

Also, two or more players 80*a* to 80*d* may beat each of the ghost hands 108*a* to 108*d* (e.g., many or all ghost hands bust). Here, the highest hand of the two or more players wins the bonus ball. If the two or more players are also tied, any of the embodiments for such condition discussed above can be used to resolve the condition.

FIG. 5 thus illustrates one way of equalizing the bonus game so that the bonus game is played the same regardless of how many players are playing the base blackjack game. It should be appreciated that other suitable ways may be employed.

Figure 6:
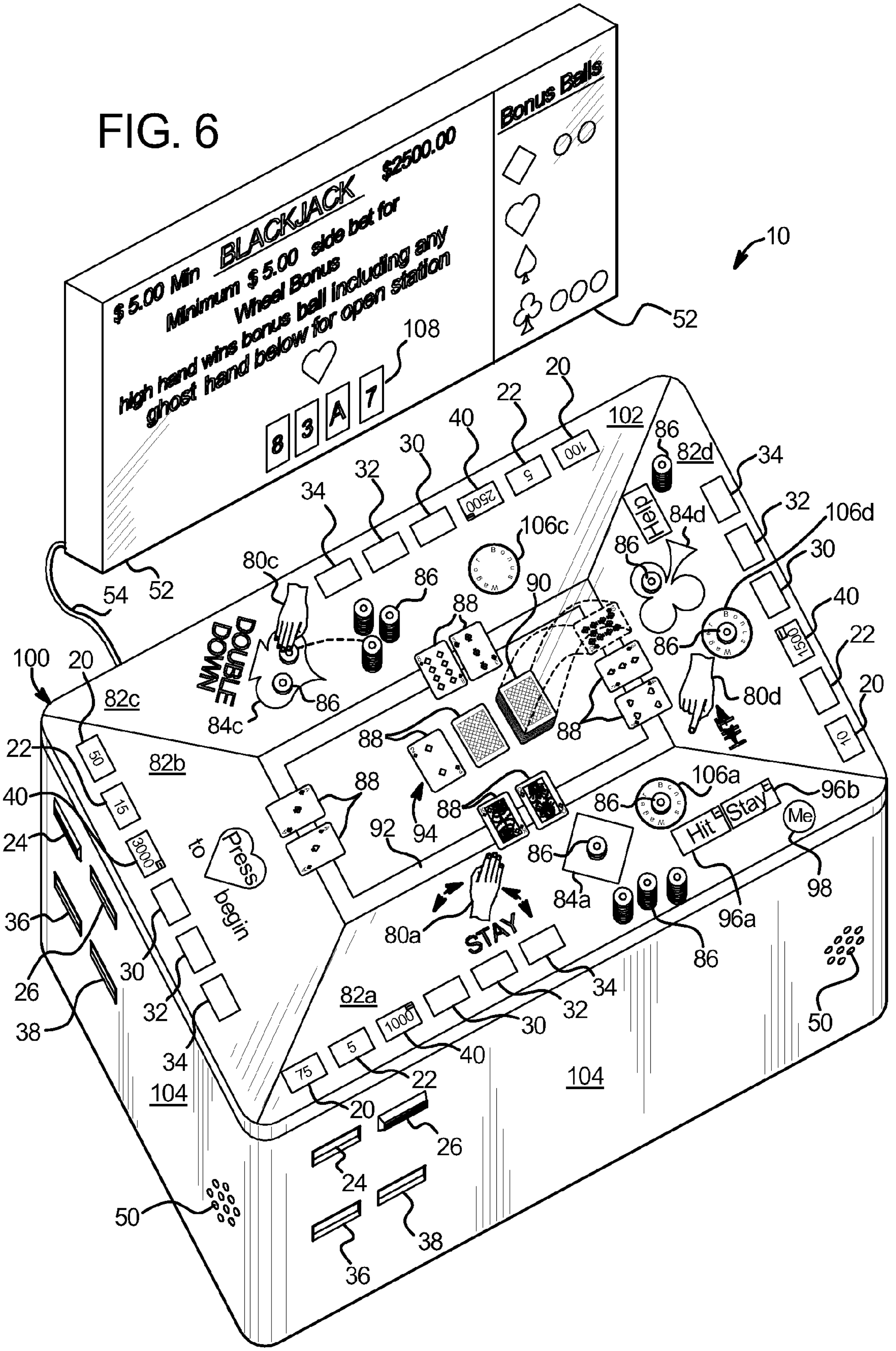
FIG. 6 is a perspective view of one embodiment of a gaming system having the multiple player simultaneous display/input device game table of the present disclosure operating a blackjack base game having an alternative bonus game.

Referring now to FIG. 6, another way of achieving equal bonus play is illustrated. Here, no player is playing at station 82*b* (players 80*a*, 80*c* and 80*d* could decide to press a "subtract player" button to reconfigure game table 100 to having only three stations). Overhead display 52 illustrates another alternative embodiment for when less than all possible players are playing the blackjack base game. Here, gaming system 10 plays a ghost hand 108 for the unfilled station, e.g., heart station 82*b*. All embodiments for when the high hand player ties with ghost hand 108 discussed above for FIG. 5 apply here. All embodiments for when two or more players hold the high hand discussed above for FIG. 5 apply here.

Overhead display 52 also shows how many bonus balls each player has accumulated for the next bonus. It should be appreciated that players 80*a* to 80*d* do not have to place a side wager on each hand to become eligible for the bonus. Clubs player 80*d* may for example be satisfied with three bonus balls for the next bonus and decline to place any additional side bets before the next bonus triggering event.

The bonus game can be initiated or triggered in a plurality of different ways. For example, a certain number of bonus balls, e.g., seven, accumulated and displayed on overhead screen 52 can trigger the bonus. The side bets build a progressive bonus pot. In an alternative embodiment when the progressive pot grows to a certain amount, the bonus is triggered. In a further alternative embodiment, a certain blackjack output (or combination of outputs) triggers the bonus. For example, one or more blackjack hands could trigger the bonus.

Figure 7:
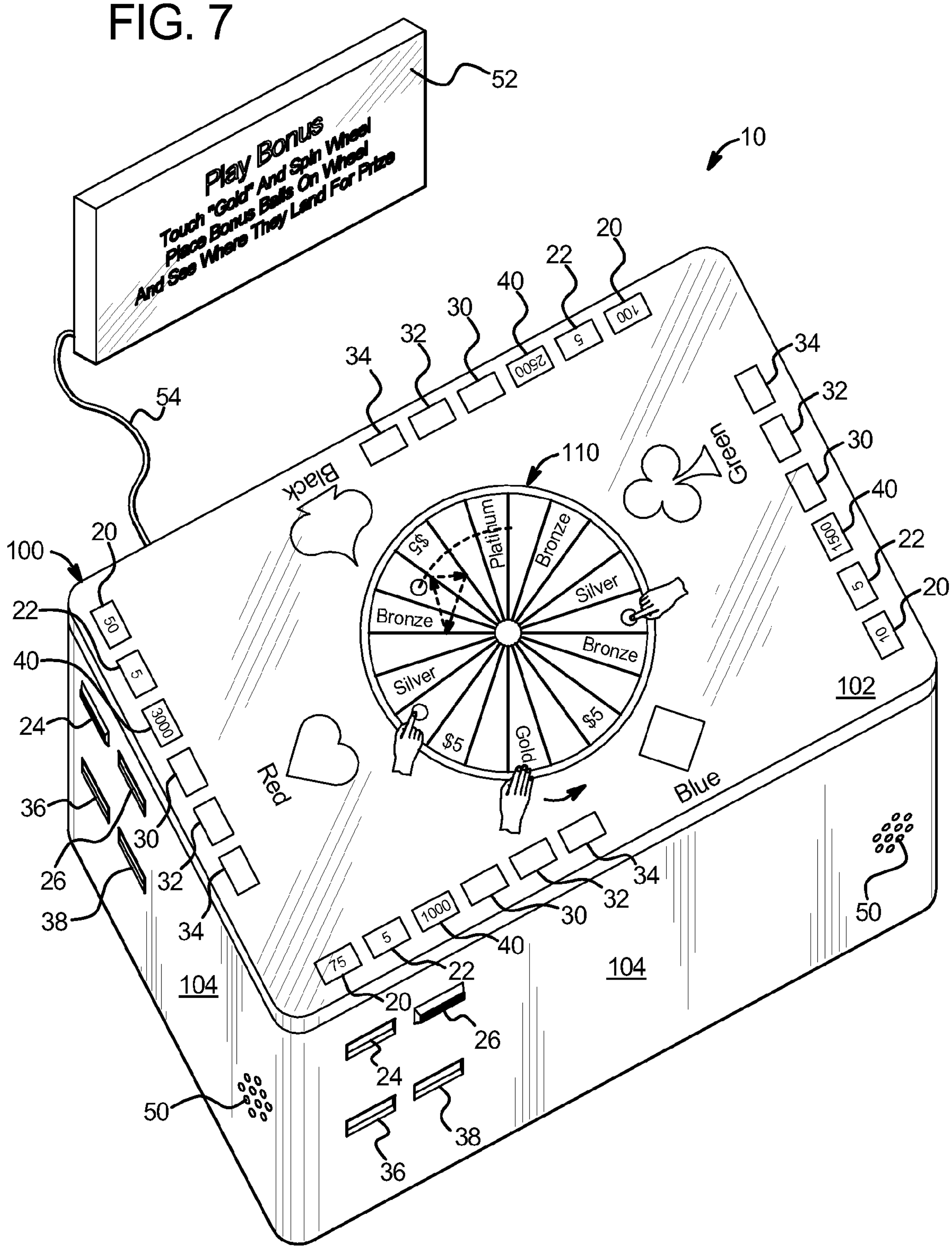
FIG. 7 is a perspective view of one embodiment of a gaming system having the multiple player simultaneous display/input device game table of the present disclosure operating a bonus game.

FIG. 7 illustrates one example embodiment of a wheel bonus game played using gaming system 10 and game table 100 of the present disclosure. The wheel bonus game illustrates how the underlying blackjack game can be cleared away or replaced to maximize the area of the group bonus game. The game shows a reverse transition of the movement of a game piece (such as a bonus ball) from player control to game control on the wheel. Further, the gaming system enables players to place their bonus balls on the bonus wheel simultaneously, which heightens the interactive experience and makes the table play more like a real game table (i.e., instead of a multiple video display game table).

This example also demonstrates a further competition between the players (i.e., each player competes for the highest possible awards on the wheel) and provides the players with a gaming experience, in which they have influence. In the embodiment described herein which employs a random number generator, to determine the final location of the bonus balls on the wheel, the outcomes are randomly determined by a random number generator and each player's initial or starting placements or positions of their bonus balls on the wheel does not affect the final positions. In the embodiment described herein which employs a virtual physics engine to determine the final locations of the bonus balls on the wheel, in certain configurations, the outcomes are in part based on each player's initial or starting placements or positions of the bonus balls on the wheel. It should also be appreciated that this embodiment where the players place the bonus balls on the wheel has a timing element in that each of the players may try to place their bonus balls on the wheel as fast as possible to fill in certain of the initial starting positions of the bonus balls. It should be appreciated that the gaming system may also be configured to enable the players to place their bonus balls in groups. It should further be appreciated that in certain embodiments, the gaming system can employ a gravity effect which appears to pull the balls downwardly on the wheel from their initial or starting positions at any suitable time during play of the secondary game including the wheel and the bonus balls.

More specifically, the bonus game of FIG. 7 includes a displayed wheel 110, which appears in place of the blackjack game on the display/input device of FIGS. 5 and 6. Large overhead display 52 instructs the players to designate one of the players to touch the gold slice of the wheel and spin the wheel to start the bonus game. Any player can spin the wheel in either direction. Alternatively, wheel 110 starts to spin automatically.

In one embodiment, once spinning, each player places their bonus balls onto the wheel 110. This bonus wheel shows an example of how game table 100 can be employed to provide a transition from player control of the movement of an object to gaming system control. A player having multiple bonus balls can place the balls on wheel 110 sequentially or two or more balls at the same time. In other embodiments, different bonus players can take turns placing their balls on wheel 110 or place the balls on wheel 100 at the same time.

In one embodiment, gaming system 10 employs a suitable physics engine that mathematically predicts in which slice of wheel 110 each player's bonus balls land based on various factors such as initial velocity, assumed mass, volume, shape and material hardness of the item or ball, angles at which the item hits different obstructions on the wheel, platform, other items, etc., and speed of the wheel, etc. These factors determine the odds and probabilities of obtaining the various outcomes. The bonus balls therefore substantially appear to move and bounce as they would in real life. This example thus illustrates how the game table including the display/input device of the present disclosure provide a virtual gaming experience which is more like a live table gaming experience, while still providing all of the security and other advantages of a fully automated gaming system controlled environment.

Continuing with this illustrated example embodiment, it should be appreciated that the awards associated with the wheel can be determined in any suitable manner. In one example embodiment, the bonus game has four progressive pools including a Platinum progressive pool which starts a $200, a Gold progressive pool which starts at $100, a Silver progressive pool which starts at $25, and a Bronze progressive pool which starts at $10. In one embodiment, the Platinum progressive pool increments at a rate of 5% of the side wagers made to play for or obtain bonus balls, the Gold progressive pool increments at a rate of 3% of the side wagers made to play for or obtain bonus balls, the Silver progressive pool increments at a rate of 2% of the side wagers made to play for or obtain bonus balls, the Bronze progressive pool increments at a rate of 1% of the side wagers made to play for or obtain bonus balls.

In one embodiment, since there are multiple sections of the wheel which are Silver (e.g., two sections) and Bronze (e.g., three sections), the gaming system maintains multiple progressives for each such level so that if multiple bonus balls land in those sections, each ball (or player with such ball) is entitled to win the progressive award at that level. In one embodiment, such multiple same level progressive awards would thus be maintained at the same amounts such as two Silver progressive pools each having a same starting or reset value and a same increment rate such as an increment rate of 2% of the side wagers made to play for or obtain bonus balls, and three Bronze progressive pools each having a same starting or reset value and a same increment rate such as an increment rate of 1% of the side wagers made to play for or obtain bonus balls.

Additionally, certain such embodiments account for the situation if one of the same level pools (such as one of the Silver progressive pools) is awarded and one is not awarded. In one such embodiment, the portion of such progressive pool which is incremented from the side wagers is added to the next reset value for such level pools. For example, if only one Silver pool is awarded at a value of $49 (i.e., $25 from the initial value and $24 from the increments based on the side wager), then the $24 from the second Silver pool (which is not awarded) is divided for the reset for both Silver pools. Such reset values would be $37 for each Silver progressive pool (i.e., $25 from the initial value and $12 from the leftover increment value of the second pool—which is half of the second Silver Progressive pool increment value). It should also be appreciated that the division of the leftover increment value(s) will depend on how many pools are at that level and how many pools are awarded.

In an alternative embodiment, the gaming system maintains a single progressive pool for each level so that if multiple bonus balls land in those sections, each ball (or player with such ball) is entitled to share of the progressive award at that level. In one embodiment, the total number of shares in the progressive is determined by the total number of bonus balls that land on the progressive level indicator. It should also be appreciated that there may be multiple wheel segments that map to a single progressive level. It is therefore possible for multiple balls of one player to stop on or within a single progressive level by either coming to rest on or within the same wheel segment or by coming to rest in different wheel segments that share the same progressive level. In either case, each additional bonus ball for such player increases their number of shares in the progressive award.

It should also be appreciated that multiple wheels and/or multiple plays of the wheel can be provided. It should also be appreciated that other suitable devices (besides wheels) can be displayed as the bonus display.

It should be appreciated that the above example embodiments of the present disclosure provide a gaming system that enables players to compete for game outcomes or tokens (such a bonus balls) in an at least partially skill based gaming event (such a blackjack) for use in a second random event (such as the spin of the bonus wheel).

It should also be appreciated that the above example embodiments of the present disclosure provide a gaming system that enables multiple players to simultaneously interact with a displayed bonus game.

It should also be appreciated that the present disclosure provides a gaming system that enables multiple players to simultaneously interact with a displayed primary game.

It should also be appreciated that the above example embodiments of the present disclosure provide a gaming system that enables multiple players to interact with a separate physical bonus device such as a device which interacts with the above described wheel.

As indicated above, in alternative embodiments, the gaming system provides alternative primary or base games such as non-skill based games. One such example is a gaming game table that displays and enables multiple players to simultaneously play one or more slot type game. The slot games may be any suitable slot games. In such slot games, the players are not competing with one another, but the game table provides a group or live table experience. In one alternative embodiment, the players are playing their individual slot games competing for tokens such as bonus balls. For each play or set of plays of the slot games, the player who obtains a designated level or result (such as the player to obtain the best win) obtains the bonus ball. As above, ties can be determined in any suitable manner (such as the player who obtained certain symbols). The tokens or bonus balls are used to play a bonus such as these described above. In other embodiments, the game table 100 provides for tournament type play between the players at the game table.

In further alternative embodiments, the gaming system provides the players with the option to play side or extra games while player a main group game such a blackjack. The gaming system can display such side or extra games in a suitable section of the player area. In such embodiments, the display/input device is configured to receive inputs simultaneously from multiple players for play of these side or extra games.

It should be appreciated that the gaming system of the present disclosure enables each of one or more players to simultaneously play one or more primary games and one or more secondary games. It should further be appreciated that the gaming system enables each of the players to readily switch back and forth between such games.

It should also be appreciated that in further embodiments, the gaming system enables one or more of the players to place additional bets or wagers such as side bets as one or more other players or mid-game bets on one or more other players. In various example embodiments: (a) one player can bet that another player will bust; (b) one player can bet that another player will hit 21; and (c) one player can bet that another player will win. The gaming system can enable these bets to be placed simultaneously or in turn.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a game table having a single multiplayer display/input device; and at least one processor configured to operate with the single multiplayer display/input device to:

(a) display a play of a wagering game to a plurality of players using the single multiplayer display/input device, wherein the single multiplayer display/input device is configured to enable the plurality of players to sequentially take turns in said play of the wagering game using the single multiplayer display/input device, (b) display any awards resulting from said play of the wagering game using the single multiplayer display/input device, (c) display a play of a secondary game to the plurality of players, wherein the single multiplayer display/input device is configured to enable each of the plurality of players to simultaneously make an input for said play of the secondary game using the single multiplayer display/input device, and (d) display any awards resulting from said play of the secondary game using the single multiplayer display/input device.

2. The gaming system of claim 1, wherein the single multiplayer display/input device is configured to enable each of the plurality of players to simultaneously make a wager on said play of the wagering game using the single multiplayer display/input device.

3. The gaming system of claim 1, wherein the single multiplayer display/input device is configured to enable each of the plurality of players to make a side wager on said play of the wagering game using the single multiplayer display/input device.

4. The gaming system of claim 1, wherein the wagering game is a blackjack wagering game.

5. The gaming system of claim 1, wherein the display of said play of the secondary game includes a display of a wheel.

6. The gaming system of claim 5, which is configured such that the input made by each player is an input placing a displayed object on the displayed wheel for said play of the secondary game using the single multiplayer display/input device.

7. The gaming system of claim 6, wherein the at least one processor is configured to use a random number generator to determine the position of each of the displayed objects on the displayed wheel.

8. The gaming system of claim 6, wherein the at least one processor is configured to use a virtual physics engine to determine the position of each of the displayed objects on the displayed wheel.

9. A gaming system comprising:

a game table having a single multiplayer display/input device; and at least one processor configured to operate with the single multiplayer display/input device to:

(a) display a plurality of plays of a wagering game to multiple players, wherein for each of the plurality of plays of the wagering game, the single multiplayer display/input device is configured to enable the plurality of players to simultaneously make wagers on said play of the wagering game using the single multiplayer display/input device, (b) for each of a plurality of said plays of the primary wagering game, randomly determine which of the plurality of players earn a bonus outcome, (c) for each player, display an indication of the bonus outcomes earned by the player, and (d) after a triggering event, (i) display a bonus display using the single multiplayer display/input device, (ii) enable each of the plurality of the players who have earned a designated amount of bonus outcomes to simultaneously move at least one of the player's earned bonus outcomes relative to the bonus display using the single multiplayer display/input device, (iii) display said earned bonus outcomes moving to positions relative to the bonus display using the multiplayer display/input device base, said positions determined by a virtual physics engine, and (iv) display any awards determined based the positions of the bonus outcomes relative to bonus display using the multiplayer display/input device.

10. The gaming system of claim 9, wherein the single multiplayer display/input device is configured to enable each of the plurality of players to sequentially take turns in each of said plurality of plays of the wagering game using the single multiplayer display/input device.

11. The gaming system of claim 9, wherein the single multiplayer display/input device is configured to enable each of the plurality of players to make a side wager on each of said plurality of plays of the wagering game using the single multiplayer display/input device.

12. The gaming system of claim 9, wherein the wagering game is a blackjack wagering game.

13. The gaming system of claim 9, wherein the display of said play of the secondary game includes a display of a wheel.

14. The gaming system of claim 13, wherein the single multiplayer display/input device is configured to display each of the bonus outcomes as an object and to enable each of the plurality of players to simultaneously place one of the displayed objects on the displayed wheel for said play of the secondary game using the single multiplayer display/input device.

15. A gaming system comprising:

a game table having a single multiplayer display/input device; and at least one processor configured to operate with the single multiplayer display/input device to:

(a) display a plurality of plays of a blackjack wagering game to multiple players using the single multiplayer display/input device, wherein the single multiplayer display/input device is configured to enable the plurality of players, for each play of the blackjack wagering game to:

(i) simultaneously make wagers on said play of the blackjack wagering game using the single multiplayer display/input device, and (ii) simultaneously make side wagers to earn a bonus ball for said play of the blackjack wagering game using the single multiplayer display/input device, and (b) after a triggering event, (i) display a wheel using the single multiplayer display/input device, (ii) enable a plurality of the players who have earned a designated amount of bonus balls to simultaneously place such earned bonus balls on the wheel using the single multiplayer display/input device, and (iii) display any awards determined based on positions of the bonus balls on the wheel using the single multiplayer display/input device.

16. The gaming system of claim 15, wherein the at least one processor is configured to use a random number generator to determine the positions of the bonus balls on the wheel.

17. The gaming system of claim 15, wherein the at least one processor is configured to use a virtual physics engine to determine the positions of the bonus balls on the wheel.

18. The gaming system of claim 15, wherein the at least one processor is configured provide one of the bonus balls to the player in at least one of the plays of the blackjack game by if a designated winning condition occurs for the player.

19. The gaming system of claim 15, wherein a plurality of different progressive awards are associated with sections of the wheel.

* * * * *

UNITED STATES PATENT AND TRADEMARK OFFICE

CERTIFICATE OF CORRECTION

PATENT NO. : 7,976,372 B2
APPLICATION NO. : 12/267092
DATED : July 12, 2011
INVENTOR(S) : Anthony J. Baerlocher et al.

It is certified that error appears in the above-identified patent and that said Letters Patent is hereby corrected as shown below:

IN THE CLAIMS:

In Claim 9, column 35, line 29, delete “base,”

Signed and Sealed this
Thirtieth Day of August, 2011

David J. Kappos
*Director of the United States Patent and Trademark Office*